United States Patent
Wang et al.

(10) Patent No.: US 10,165,272 B2
(45) Date of Patent: Dec. 25, 2018

(54) PICTURE-LEVEL QP RATE CONTROL PERFORMANCE IMPROVEMENTS FOR HEVC ENCODING

(71) Applicant: ARRIS Enterprises, Inc., Suwanee, GA (US)

(72) Inventors: Limin Wang, San Diego, CA (US); Seungwook Hong, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 357 days.

(21) Appl. No.: 15/011,410

(22) Filed: Jan. 29, 2016

(65) Prior Publication Data
US 2016/0227219 A1    Aug. 4, 2016

Related U.S. Application Data

(60) Provisional application No. 62/109,162, filed on Jan. 29, 2015, provisional application No. 62/116,976, filed on Feb. 17, 2015, provisional application No. 62/117,131, filed on Feb. 17, 2015, provisional application No. 62/117,581, filed on Feb. 18, 2015,
(Continued)

(51) Int. Cl.
| | |
|---|---|
| *H04N 19/152* | (2014.01) |
| *H04N 19/149* | (2014.01) |
| *H04N 19/179* | (2014.01) |
| *H04N 19/593* | (2014.01) |
| *H04N 19/126* | (2014.01) |

(Continued)

(52) U.S. Cl.
CPC ......... *H04N 19/115* (2014.11); *H04N 19/126* (2014.11); *H04N 19/149* (2014.11); *H04N 19/152* (2014.11); *H04N 19/172* (2014.11); *H04N 19/179* (2014.11); *H04N 19/593* (2014.11)

(58) Field of Classification Search
CPC .. H04N 19/115; H04N 19/126; H04N 19/149; H04N 19/152; H04N 19/172; H04N 19/179; H04N 19/593
USPC .................................................... 375/240.03
See application file for complete search history.

(56) References Cited

U.S. PATENT DOCUMENTS

| | | | | |
|---|---|---|---|---|
| 5,686,963 A | * | 11/1997 | Uz | .................. H04N 21/23406 375/240.06 |
| 5,872,598 A | * | 2/1999 | Legall | .............. H04N 21/23406 348/E5.066 |

(Continued)

OTHER PUBLICATIONS

Jing et al "A Novel Intra-Rate Estimation Method for H.264 Rate Control" 2006.*

(Continued)

*Primary Examiner* — Gims S Philippe
*Assistant Examiner* — Stefan Gadomski
(74) *Attorney, Agent, or Firm* — Thomas A. Ward

(57) ABSTRACT

A method and system are provided for controlling a bit rate of an encoded video that includes a plurality of pictures. In the method, each of the plurality of pictures is one of a plurality of picture types. For the method, the number of bits required to encode a current picture as well as other pictures in a window is determined, and the fullness of a buffer storing the current picture and other picture data is estimated and compared to buffer fullness limits. This process is repeated for different quantization values to determine a suitable quantization value.

18 Claims, 20 Drawing Sheets

Related U.S. Application Data provisional application No. 62/117,584, filed on Feb. 18, 2015, provisional application No. 62/152,205, filed on Apr. 24, 2015, provisional application No. 62/152,223, filed on Apr. 24, 2015, provisional application No. 62/152,240, filed on Apr. 24, 2015.

(51) Int. Cl.
*H04N 19/172* (2014.01)
*H04N 19/115* (2014.01)

(56) References Cited

U.S. PATENT DOCUMENTS

| | | | | |
|---|---|---|---|---|
| 5,929,916 | A * | 7/1999 | Legall | H04N 19/176 375/240.05 |
| 6,201,844 | B1 * | 3/2001 | Bailleul | H04N 21/23406 375/372 |
| 6,385,241 | B1 * | 5/2002 | Saw | H04N 19/159 375/240.03 |
| 6,473,459 | B1 * | 10/2002 | Sugano | H04N 19/142 375/240.16 |
| 6,650,787 | B1 * | 11/2003 | Takahashi | H04N 19/197 375/E7.133 |
| 7,409,097 | B2 * | 8/2008 | Zhang | H04N 19/197 348/385.1 |
| 7,746,928 | B2 | 6/2010 | Wang et al. | |
| 8,483,272 | B2 * | 7/2013 | Brailovskiy | H04N 19/159 375/240.03 |
| 8,532,169 | B2 | 9/2013 | Wang et al. | |
| 8,681,858 | B2 | 3/2014 | Wang | |
| 2003/0007559 | A1 * | 1/2003 | Lallet | H04N 19/159 375/240.03 |
| 2004/0037357 | A1 * | 2/2004 | Bagni | G06T 9/005 375/240.15 |
| 2004/0081236 | A1 * | 4/2004 | Seo | H04N 19/176 375/240.03 |
| 2005/0084007 | A1 * | 4/2005 | Lightstone | H04N 19/159 375/240.03 |
| 2005/0169545 | A1 * | 8/2005 | Ratakonda | H04N 19/107 382/238 |
| 2005/0175093 | A1 * | 8/2005 | Haskell | H04N 19/159 375/240.03 |
| 2006/0088099 | A1 * | 4/2006 | Gao | H04N 19/176 375/240.16 |
| 2006/0146928 | A1 * | 7/2006 | Wang | H04N 19/176 375/240.03 |
| 2006/0159169 | A1 * | 7/2006 | Hui | H04N 19/176 375/240.03 |
| 2006/0233237 | A1 * | 10/2006 | Lu | H04N 19/176 375/240.03 |
| 2007/0025441 | A1 * | 2/2007 | Ugur | H04N 19/159 375/240.03 |
| 2007/0071094 | A1 * | 3/2007 | Takeda | H04N 19/197 375/240.04 |
| 2007/0263720 | A1 * | 11/2007 | He | H04N 19/124 375/240.03 |
| 2008/0123738 | A1 * | 5/2008 | Katsavounidis | H04N 19/159 375/240.01 |
| 2011/0051806 | A1 * | 3/2011 | Lee | H04N 19/159 375/240.03 |
| 2011/0090960 | A1 * | 4/2011 | Leontaris | H04N 19/103 375/240.12 |
| 2012/0076202 | A1 * | 3/2012 | Brailovskiy | H04N 19/159 375/240.03 |
| 2012/0230400 | A1 * | 9/2012 | Lu | H04N 19/56 375/240.12 |
| 2013/0089137 | A1 * | 4/2013 | Korman | H04N 19/124 375/240.03 |
| 2013/0272383 | A1 * | 10/2013 | Xu | H04N 19/172 375/240.03 |
| 2014/0376616 | A1 * | 12/2014 | Li | H04N 19/124 375/240.03 |
| 2014/0376624 | A1 * | 12/2014 | Li | H04N 19/159 375/240.12 |
| 2015/0281705 | A1 | 10/2015 | Wang et al. | |
| 2015/0373328 | A1 * | 12/2015 | Yenneti | H04N 19/61 375/240.03 |
| 2016/0029020 | A1 * | 1/2016 | Eymery | H04N 19/115 382/251 |
| 2016/0029042 | A1 * | 1/2016 | Eymery | H04N 19/107 375/240.15 |
| 2016/0094846 | A1 * | 3/2016 | Lee | H04N 19/124 375/240.03 |

OTHER PUBLICATIONS

Li et al. "Adaptive rate control for H.264" Jounal of Visual Communication and Image Representation 2005.*
Kim et al "Adaptive Rate Control in Frame-layer for Real-time H.264/AVC" 2008.*
Hrarti et al. "Improving the quality of H.264/AVC by using a new rate-quantization model" SPIE 2011.*
Hrarti et al. "A perceptual optimization of H.264/AVC bit allocation at the frame and macroblock level" 2012.*
Hrarti et al. "A New approach of Rate-Quantization Modeling for Intra and Inter Frames in H.264 Rate Control".*
Ding et al. "Rate Control of MPEG Video Coding and Recording by Rate-Quantization Modeling" 1996.*
Wang et al. "Rate-Distortion Optimization of Rate Control for H.264 With Adaptive Initial Quantization Parameter Determination" 2008.*

* cited by examiner

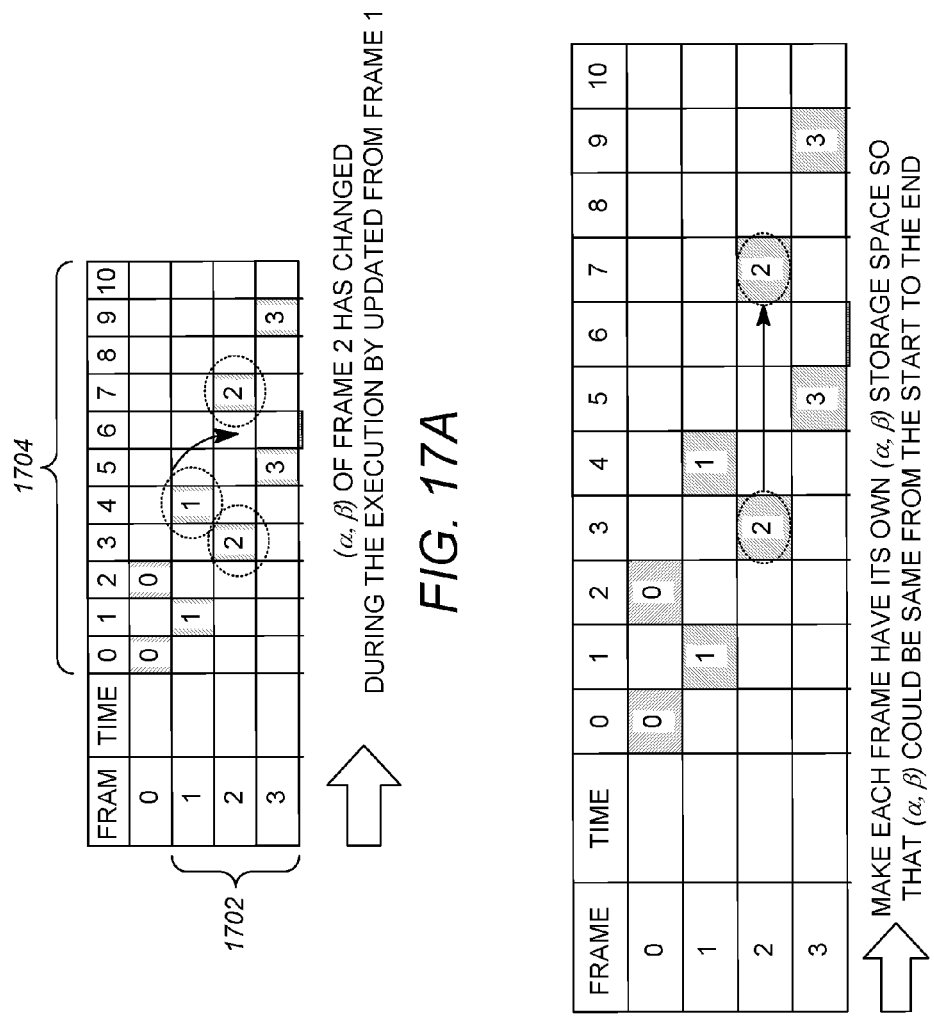

PICTURE-LEVEL QP RATE CONTROL PERFORMANCE IMPROVEMENTS FOR HEVC ENCODING

CROSS-REFERENCE TO RELATED APPLICATIONS

This application claims benefit of each of the following U.S. Provisional Patent Applications, each of which are incorporated by reference herein:

U.S. Provisional Patent Application No. 62/109,162, entitled "PICTURE-LEVEL QP RATE CONTROL FOR HEVC ENCODING," by Limin Wang and Seungwook Hong, filed Jan. 29, 2015, which application is hereby incorporated by reference herein;

U.S. Provisional Patent Application No. 62/116,976, entitled "RESET (A, B) FOR EVERY LEVEL AFTER NEW SCENE CHANGE," by Limin Wang and Seungwook Hong, filed Feb. 17, 2015;

U.S. Provisional Patent Application No. 62/117,131, entitled "RESET (A,B) FOR NON-INTRA PICTURE IF THERE ARE TOO MANY INTRA BLOCKS," by Limin Wang and Seungwook Hong, filed Feb. 17, 2015;

U.S. Provisional Patent Application No. 62/117,581, entitled "EXCLUSION FOR MODEL PARAMETER (A, B) IN PARALLEL PICTURE," by Limin Wang and Seungwook Hong, filed Feb. 18, 2015;

U.S. Provisional Patent Application No. 62/117,584, entitled "FILL BUFFER LEVEL GAP WITH PREDICTION IN PARALLEL PICTURE," by Limin Wang and Seungwook Hong, filed Feb. 18, 2015;

U.S. Provisional Patent Application No. 62/152,205, entitled "QR MODEL RESET FOR SCENE CHANGES FOR PICTURE-LEVEL RATE CONTROL FOR HEVC ENCODER," by Limin Wang and Seungwook Hong, filed Apr. 24, 2015;

U.S. Provisional Patent Application No. 62/152,223, entitled "OUTLIER PICTURE REMOVAL FOR PICTURE-LEVEL RATE CONTROL FOR HEVC ENCODER," by Limin Wang and Seungwook Hong, filed Apr. 24, 2015; and U.S. Provisional Patent Application No. 62/152,240, entitled "BIT ESTIMATE FOR QP SELECTION FOR PICTURE-LEVEL RATE CONTROL FOR HEVC ENCODER," by Limin Wang and Seungwook Hong, filed Apr. 24, 2015.

BACKGROUND

1. Field of the Invention

The present invention relates to systems and methods for encoding video data, and in particular to a system and method for controlling the quantization of the encoded video on a picture-by picture basis to prevent buffer overflow.

2. Description of the Related Art

Block-based hybrid video encoding schemes such as HEVC achieve compression not only by removing redundant information from the bitstream, but also by making adjustments in the quality of the output bitstream. While such quality compromises render HEVC an inherently lossy process, such compromises may be made in a minimally perceptible way. The quality of the output bistream may be controlled by varying a number of parameters used in the encoding process, including the quantization parameter (QP), which regulates how coarsely the output is quantized. Such quantization impacts how much spatial detail is retained in the coded bitstream. When QP is very small, the quantization step size(s) are small, and almost all that detail is retained. However, as the QP is increased, some of that detail is lost within quantization steps. The result is that bit rate drops, but at a cost of decreased fidelity (increased distortion).

Video encoders may be operated open loop (VBR) or closed loop. When operated open loop, a constant value for QP will result in reasonably constant video quality, but the bit rate may vary dramatically, as the complexity of the video source changes. Such variance places difficult requirements on the output buffers of the encoders providing the bitstream, and the input buffers of the decoders receiving the bitstream. Hence, systems and methods for varying QP depending on the complexity of the images of the uncoded source video have been developed. These systems and method vary the QP based upon an estimation of the picture complexity.

Decoders includes a buffer to smooth out variations in the arrival time and rate of the incoming coded data. The encoder providing data to the decoder must produce a bitstream that is usable by the decoder, and in particular, that does not overwhelm the input buffer with data. Accordingly, encoders use a "virtual buffer" model to estimate the fullness of the buffer in the decoder. This virtual fullness buffers is another parameter upon which variation of the QP may be based.

QP rate control may accomplished using a model that defines the quantization parameter as a function of the number of bits in the picture to be coded and two estimation parameters, a and b (also sometimes denoted as A and B, respectively). However, such models typically utilize a constant value for a and b and hence, do not predict buffer fullness as well as is otherwise possible.

What is needed is a method and apparatus that encode video using a quantization parameter derived at using estimation parameters that are adaptively adjusted depending on virtual (predicted) buffer fullness. The method and apparatus described herein satisfies that need.

SUMMARY

To address the requirements described above, a method and system for controlling a bit rate of an encoded video comprising a plurality of pictures is disclosed, wherein each of the plurality of pictures being of one of a plurality of picture types. In one embodiment, the method comprises defining a window of M pictures comprising a plurality of window pictures;

defining a parameter set for each picture type T, each parameter set comprising a quantization parameter ($Q_T$), a first parameter ($\alpha_T$), and a second parameter ($\beta_T$); estimating a number of bits $R_{cur}$ needed to encode a current picture of picture type T; estimating a number of bits $R_i$ needed to encode each remaining picture i of the window of M pictures of picture type T; determining, for the current picture and each remaining picture i of the window of M pictures and from the estimated number of bits to needed to encode the current picture $R_{cur}$ and the estimated number of bits needed encode each remaining picture i of the window of M pictures, if a maximum video buffer boundary $B_{upper}$ or a minimum video buffer boundary $B_{low}$ are exceeded; if the maximum video buffer boundary $B_{upper}$ or the minimum video buffer boundary $B_{low}$ are exceeded, adjusting $Q_{cur_T}$ for the current picture of picture type T and $Q_{i_T}$ of each remaining picture i of picture type T, and repeating the estimation using the adjusted $Q_{cur_T}$; and if the maximum video buffer boundary $B_{upper}$ and the minimum video buffer boundary $B_{low}$ are not exceeded, coding the current picture according to $Q_{cur_T}$.

BRIEF DESCRIPTION OF THE DRAWINGS

Referring now to the drawings in which like reference numbers represent corresponding parts throughout:

FIGS. 17A and 17B are diagrams illustrating the temporal relationship between processing of adjacent pictures;

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

HEVC Summary

Audio-Visual Information Transception and Storage

Figure 1:
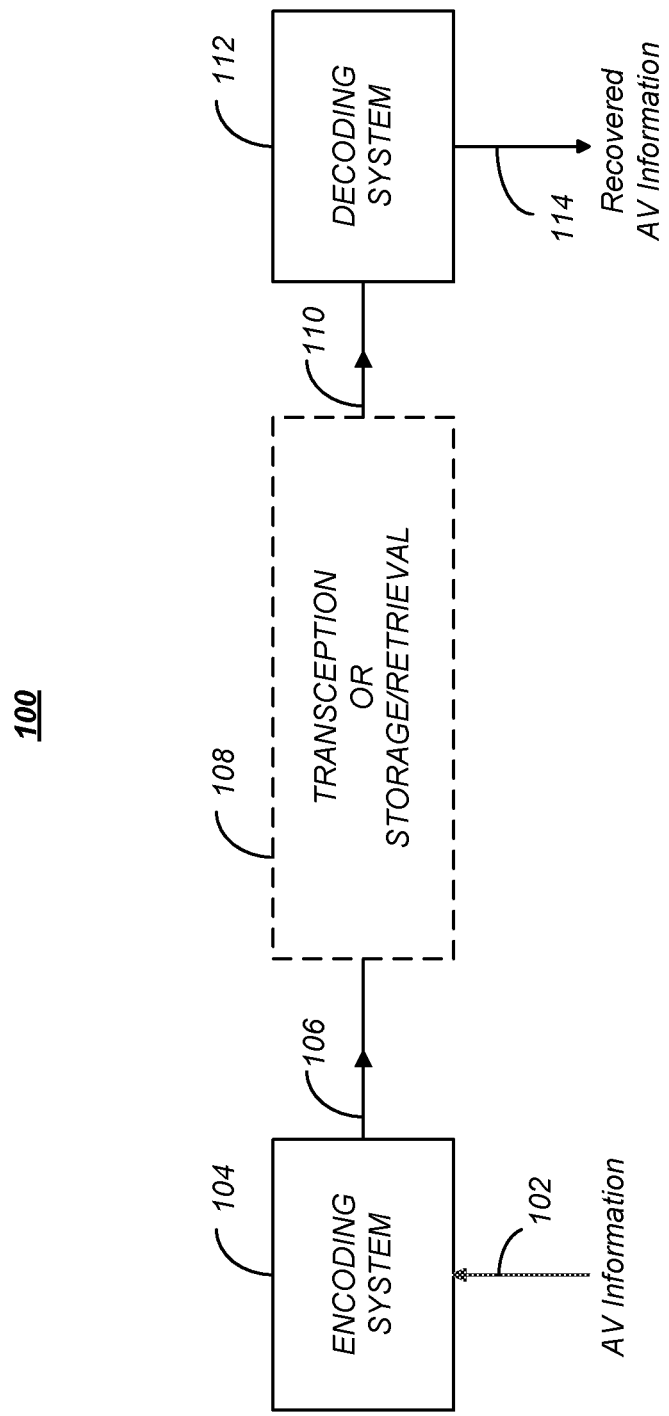
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 (also referred to hereinafter as uncoded video) and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
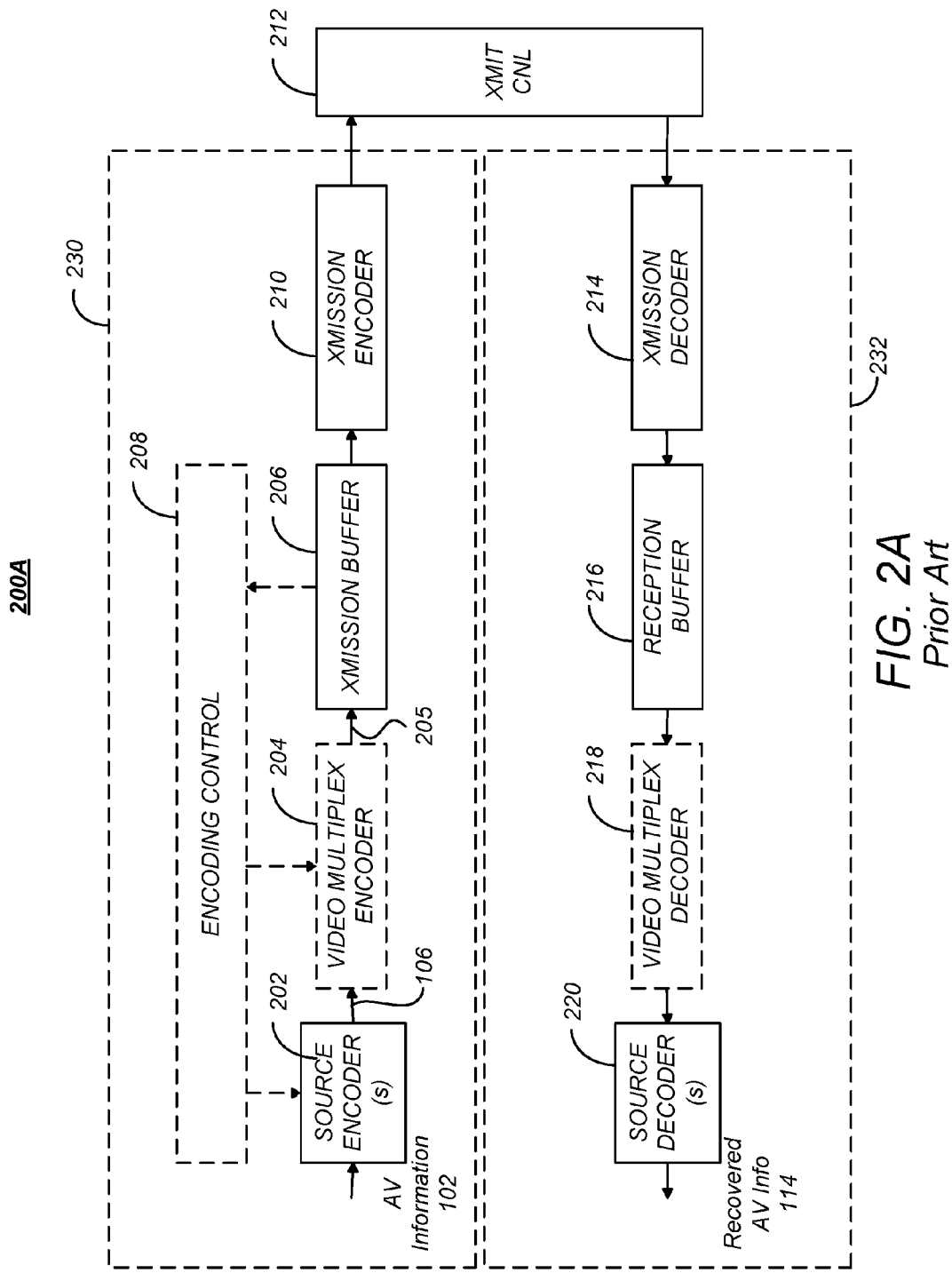
FIG. 2A is a diagram of one embodiment of a codec system in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error-correcting systems may be included to reduce or eliminate such errors. For example, the encoded AV information 106 may be forward error correction (FEC) encoded by adding redundant information, and such redundant information can be used to identify and eliminate errors in the reception segment 232.

The transmission segment 230 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 102 according to certain performance parameters that affect the instantaneous bit rate, the signals from each of the source encoders 202 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a encoding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 (hereinafter also referred to as a target decoding device) using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
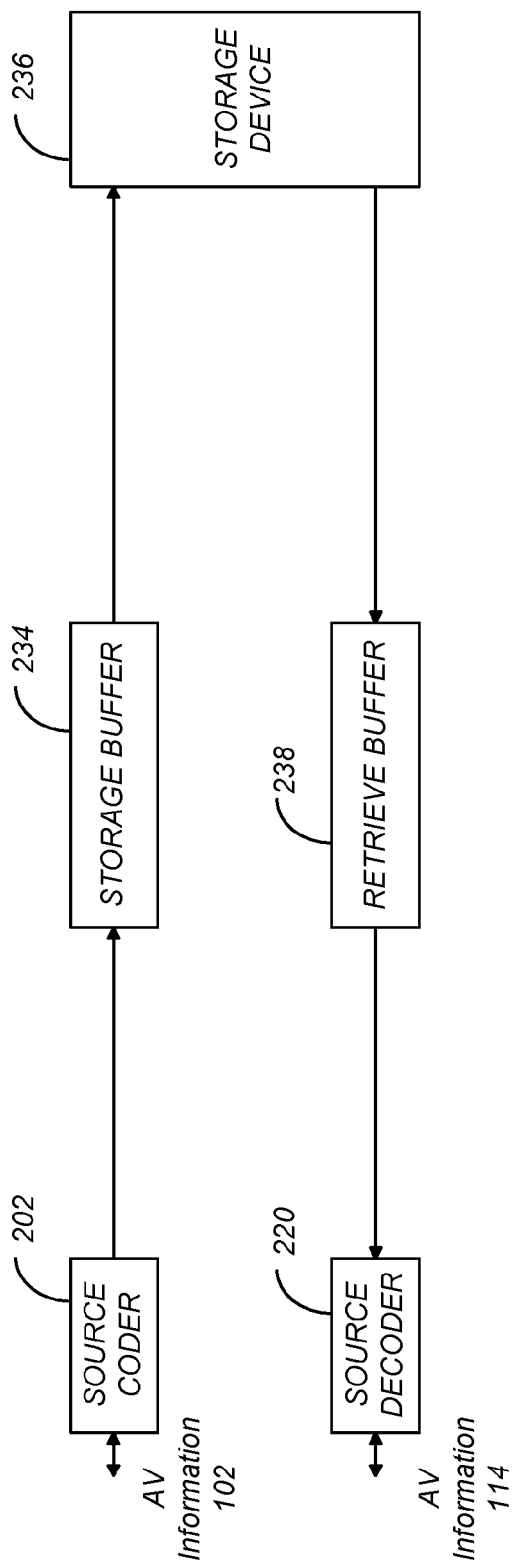
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
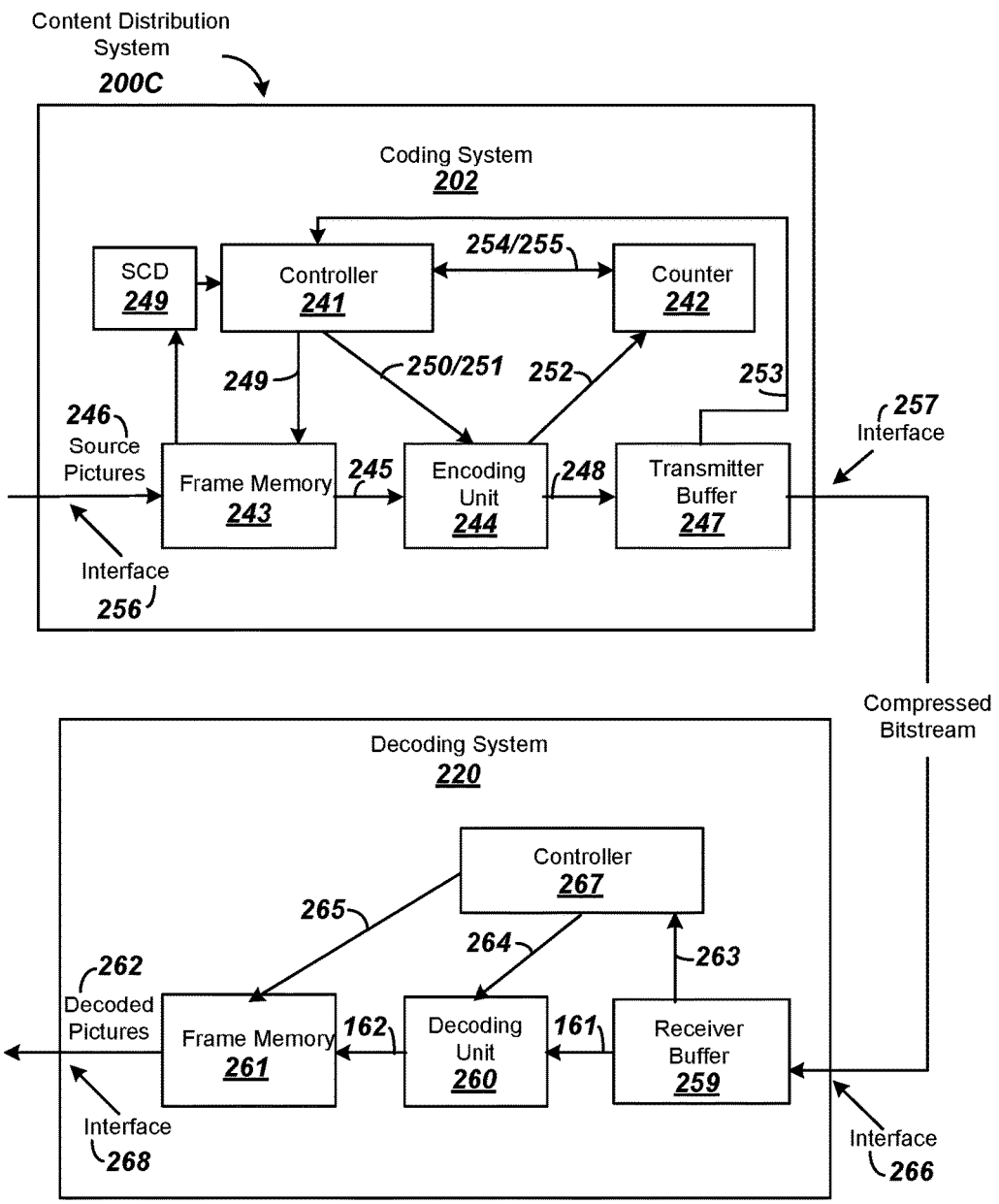
FIG. 2C is another diagram depicting an exemplary content distribution system comprising a coding system or encoder and a decoding system or decoder that can be used to transmit and receive HEVC data.

FIG. 2C is another diagram depicting an exemplary content distribution system 200C comprising a coding system or encoder 202 and a decoding system or decoder 220 that can be used to transmit and receive HEVC data.

In some embodiments, the coding system 202 can comprise an input interface 256, a scene change detector 249, a controller 241 a counter 242 a frame memory 243, an encoding unit 244, a transmitter buffer 247 and an output interface 257.

The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 247 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures 246 utilizing the controller 241. The frame memory 243 can have a first area that can be used for storing the incoming frames from the source pictures 246 and a second area that can be used for reading out the frames 245 and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 244 to start an encoding operation, such as preparing the Coding Units of a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 247.

The encoded video signal 248, including the generated video compression data, can be stored in the transmitter buffer 247. The information amount counter 242 can be incremented to indicate the total amount of data in the transmitter buffer 247. As data is retrieved and removed from the buffer, the counter 242 can be decremented to reflect the amount of data in the transmitter buffer 247. The occupied area information signal 253 can be transmitted to the counter 242 to indicate whether data from the encoding unit 244 has been added or removed from the transmitter buffer 247 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 247.

The information amount counter 242 can be reset in response to a preset signal 254 generated and output by the controller 241. After the information amount counter 242 is reset, it can count data output by the encoding unit 244 and obtain the amount of video compression data and/or video packets, which have been generated. The information amount counter 242 can supply the controller 241 with an information amount signal 255 representative of the obtained amount of information. The controller 241 can control the encoding unit 244 so that there is no overflow at the transmitter buffer 247.

In some embodiments, the decoding system 220 can comprise an input interface 266, a receiver buffer 259, a controller 267, a frame memory 261, a decoding unit 260 and an output interface 268. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 267. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 264 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 268.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below.

Figure 3:
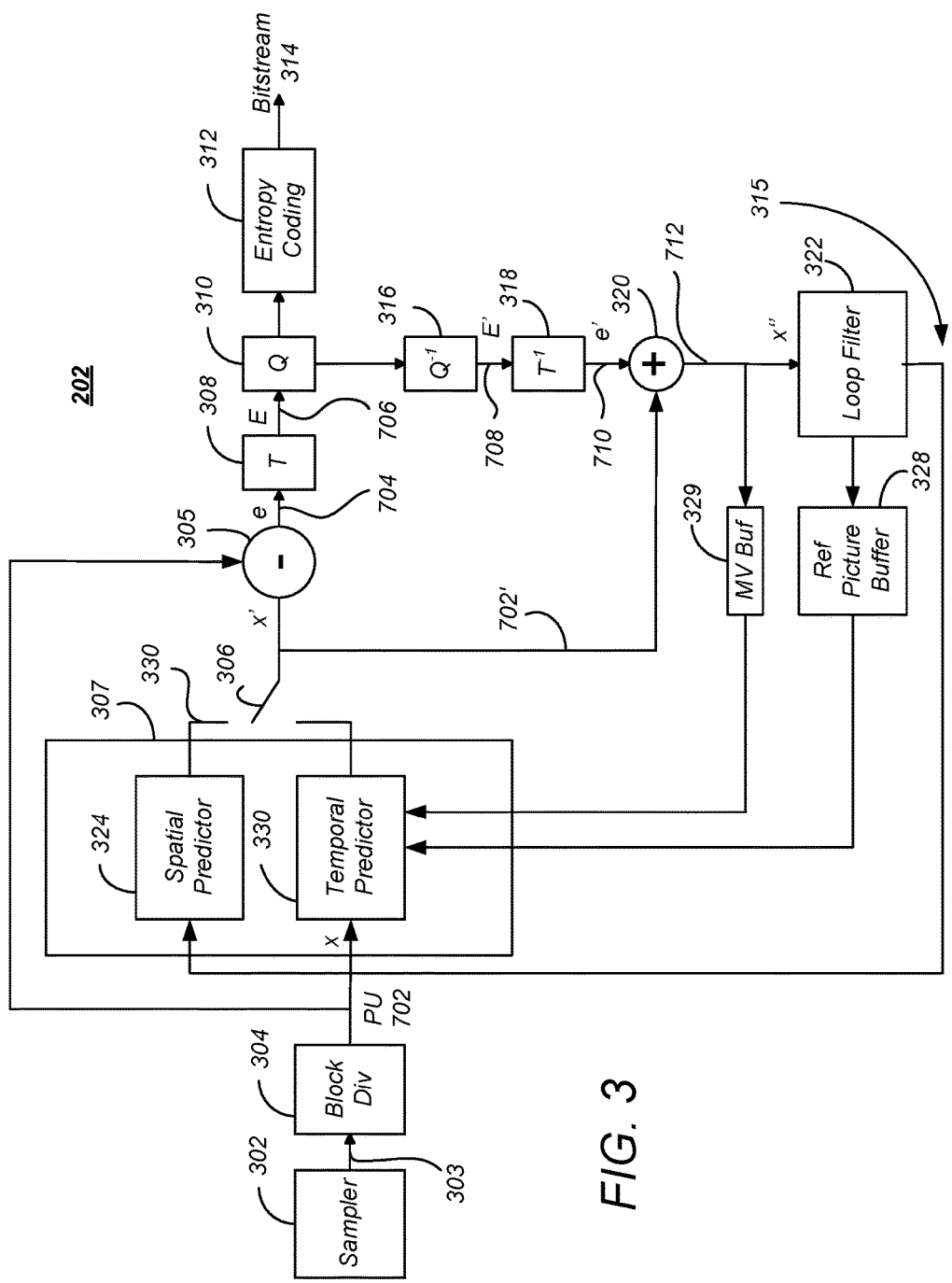
FIG. 3 is a block diagram illustrating one embodiment of the source encoder.

FIG. 3 is a block diagram illustrating one embodiment of the source encoder 202. The source encoder 202 accepts AV information 102 and uses sampler 302 to sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
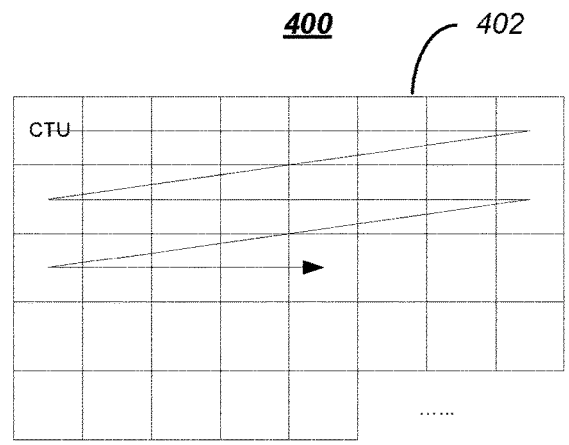
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
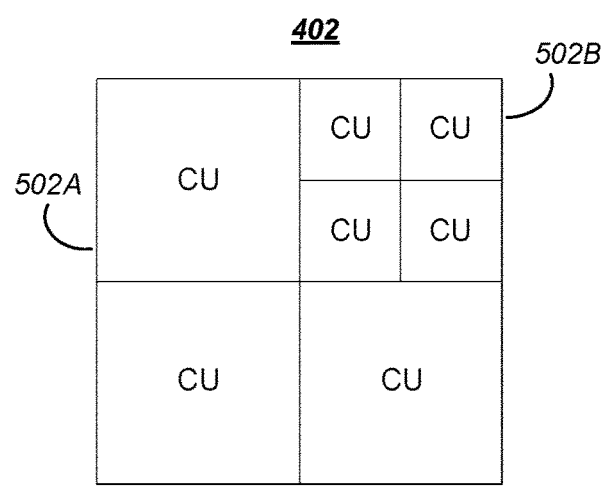
FIG. 5 is a diagram showing an exemplary partition of a coding tree block into coding units.

FIG. 5 is a diagram showing an exemplary partition of a CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402.

Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
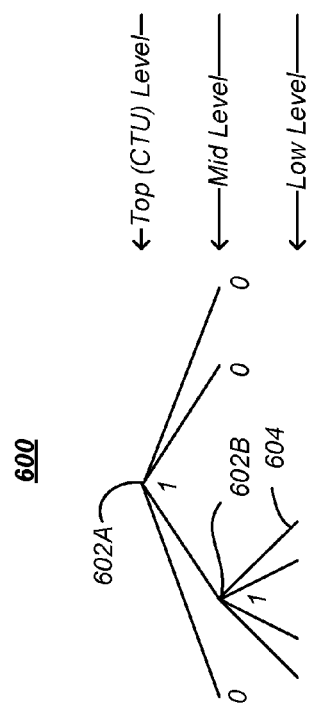
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The source encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and transform units (TUs), both of which have a maximum size equal to the size of the corresponding CU 502.

Figure 7:
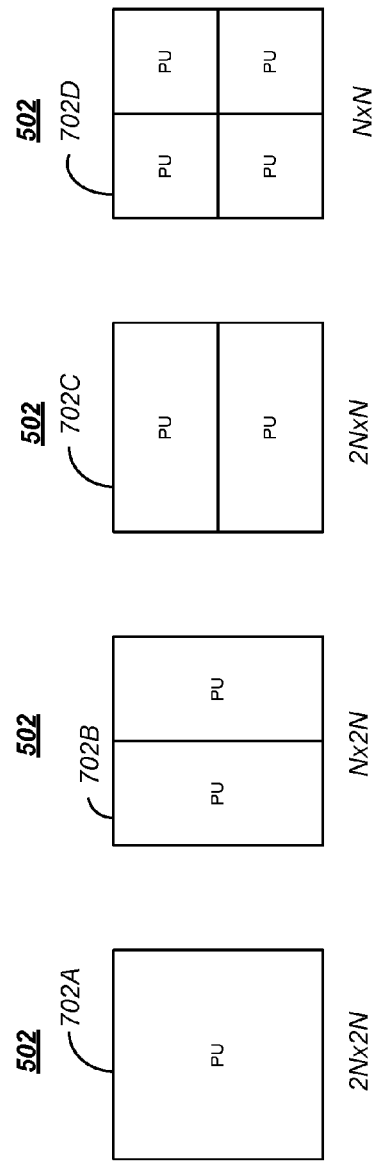
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D), as shown in FIG. 7, as well as certain other asymmetric motion partitions (AMP) defined in the HEVC specification.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
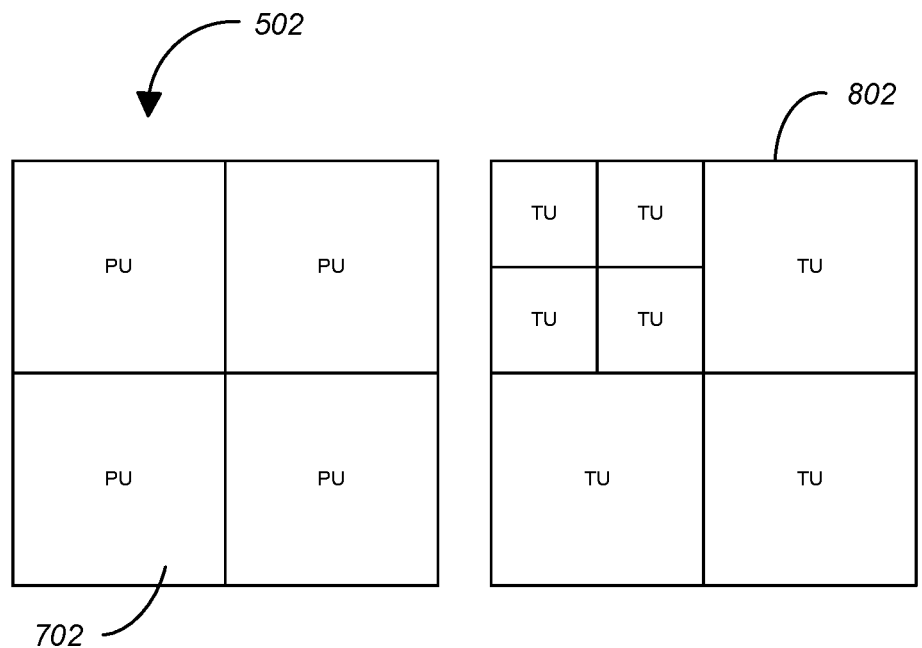
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a DCT (Discrete Cosine Transform). The size and location of each block transform TU 802 within a CU 502 is described by a "residual" quadtree (RQT) further illustrated below.

Figure 9:
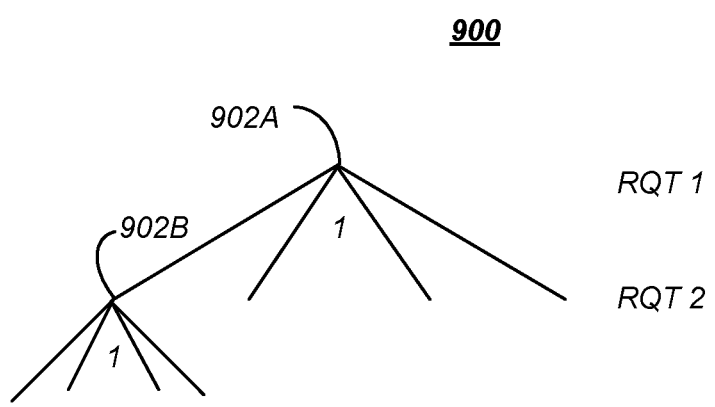
FIG. 9 is a diagram showing a residual quad tree (RQT) for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
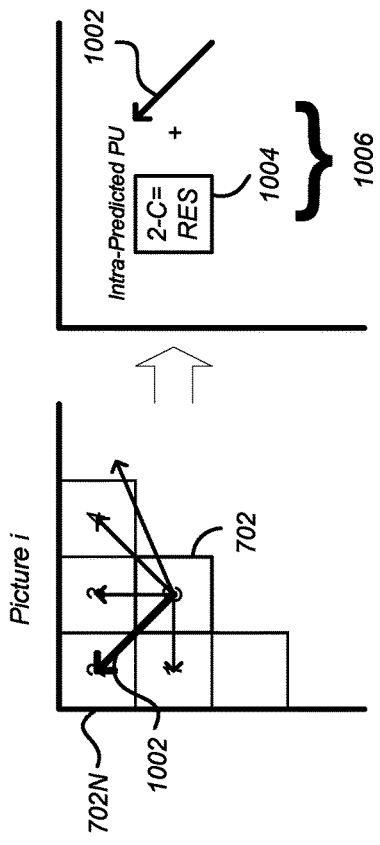
FIG. 10 is a diagram illustrating spatial prediction of prediction units.

FIG. 10 is a diagram illustrating spatial prediction of PUs 702. A picture may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 ($e$) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
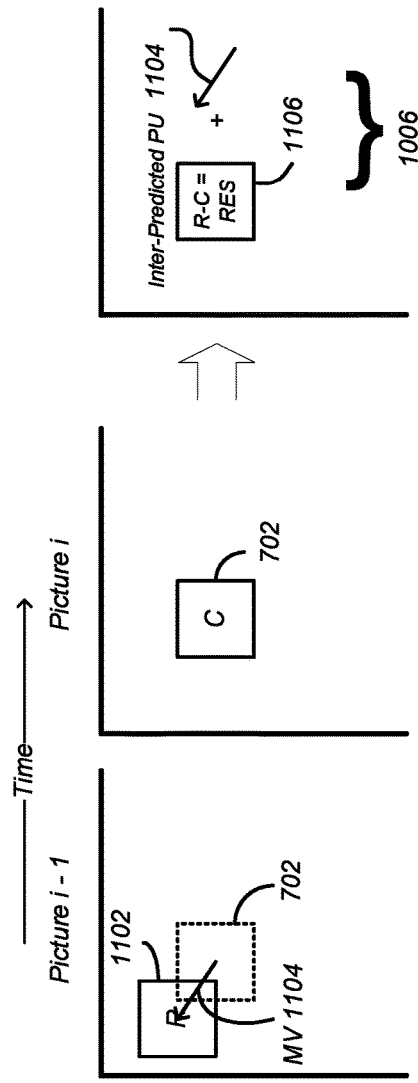
FIG. 11 is a diagram illustrating temporal prediction.

FIG. 11 is a diagram illustrating temporal prediction. Temporal prediction considers information from temporally neighboring pictures or frames, such as the previous picture, picture i−1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that defines the displacement between the current PU 702 in current frame (picture i) and the reference area 1102 (refIdx) in the reference frame (picture i−1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1006. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
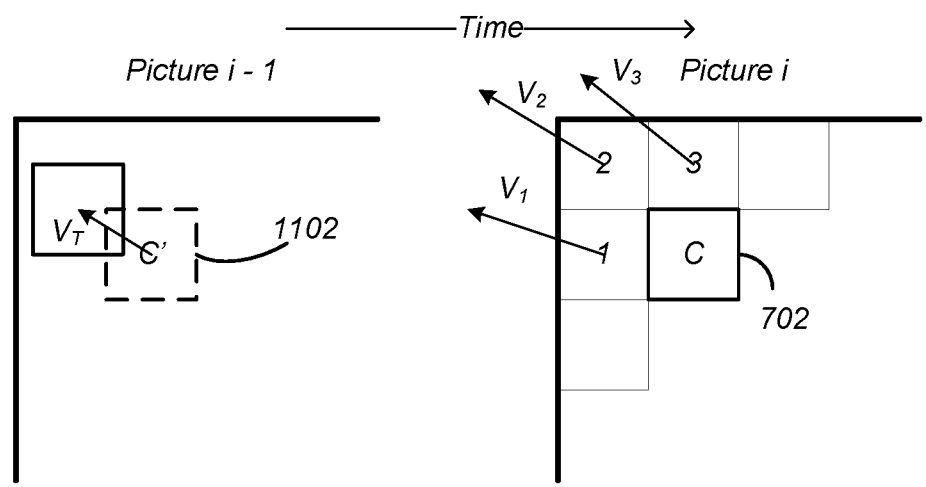
FIG. 12 is a diagram illustrating the use of motion vector predictors (MVPs)

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor $V_T$ which is the motion vector of the co-located block C' in a previously decoded picture (in decoding order) of the sequence (e. g. block of picture i−1 located at the same spatial position as the block being coded (block C of image i).

The components of the spatial motion vector predictors $V_1$, $V_2$ and $V_3$ and the temporal motion vector predictor $V_T$ can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) $V_T$ is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

The intra-predicted residuals 1004 and the inter-predicted residuals 1106 obtained from the spatial (intra) or temporal (inter) prediction process are then transformed by transform module 308 (depicted in FIG. 3) into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 3140 as a part of the useful data coding the images of the AV information. Coding syntax elements may also be coded using spatial dependencies between syntax elements to increase the coding efficiency. HEVC offers entropy coding such as context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream, typically a picture or slice header.

The filtered images, also known as reconstructed images, are then stored as reference images from reference image buffer 328 in order to allow the subsequent "Inter" predictions taking place during the compression of the subsequent images of the current video sequence.

Picture Level QP Rate Control

For quantization, HEVC uses essentially the same uniform-reconstruction quantization (URQ) scheme controlled by a quantization parameter (QP) as in H.264/MPEG-4 AVC. The range of the QP values is defined from 0 to 51, and an increase by 6 doubles the quantization step size, such that the mapping of QP values to step sizes is approximately logarithmic. Quantization scaling matrices are also supported.

To reduce the memory needed to store frequency-specific scaling values, only quantization matrices of sizes 4×4 and 8×8 are used. For the larger transformations of 16×16 and 32×32 sizes, an 8×8 scaling matrix is sent and is applied by sharing values within 2×2 and 4×4 coefficient groups in frequency sub-spaces—except for values at DC positions, for which distinct values are sent and applied.

To perform picture-level QP rate control, the QR model of equation (1) can be utilized, wherein Q represents the quantization parameter QP, R is the number of bits in the picture, and a and b are parameters.

$$Q = \beta \ln R + \alpha \qquad \text{Equation (1)}$$

Equation (1) may also be expressed as shown in Equation (2) below:

$$R = e^{\frac{Q-\alpha}{\beta}} \qquad \text{Equation (2)}$$

For a good fit between the QR model of equations (1) and (2), different sets of parameters ($\alpha$, $\beta$) can be used for pictures in different layers or pictures of different types, thus providing a different QR model for each picture type. For example, some encoders 202 support four picture types (or layers), which include an intra picture (I), an anchor reference picture (Bs), a regular reference picture (bs) and a non-reference picture (b).

Figure 13A:
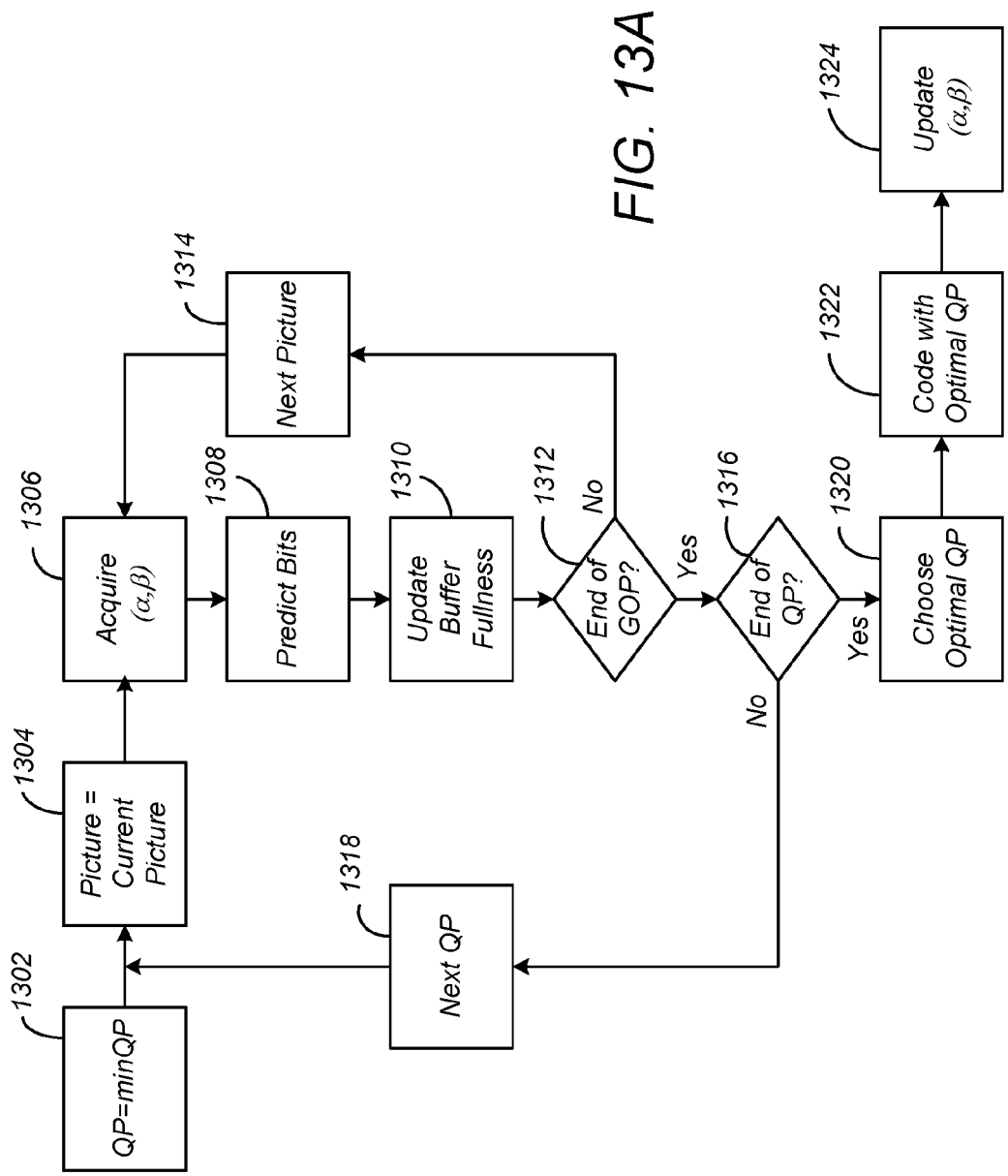
FIGS. 13A-13C each present a top level flowchart of an exemplary embodiment of a QP rate control method.
Figure 13B:
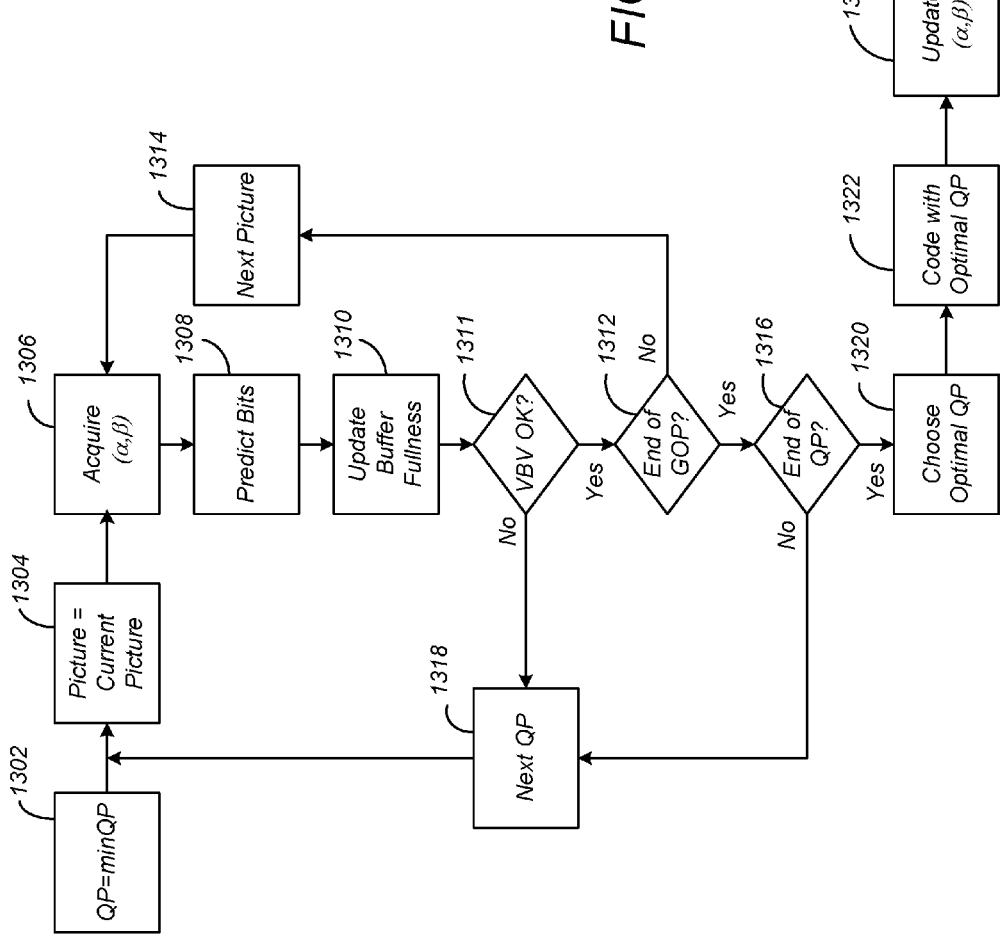
Figure 13C:
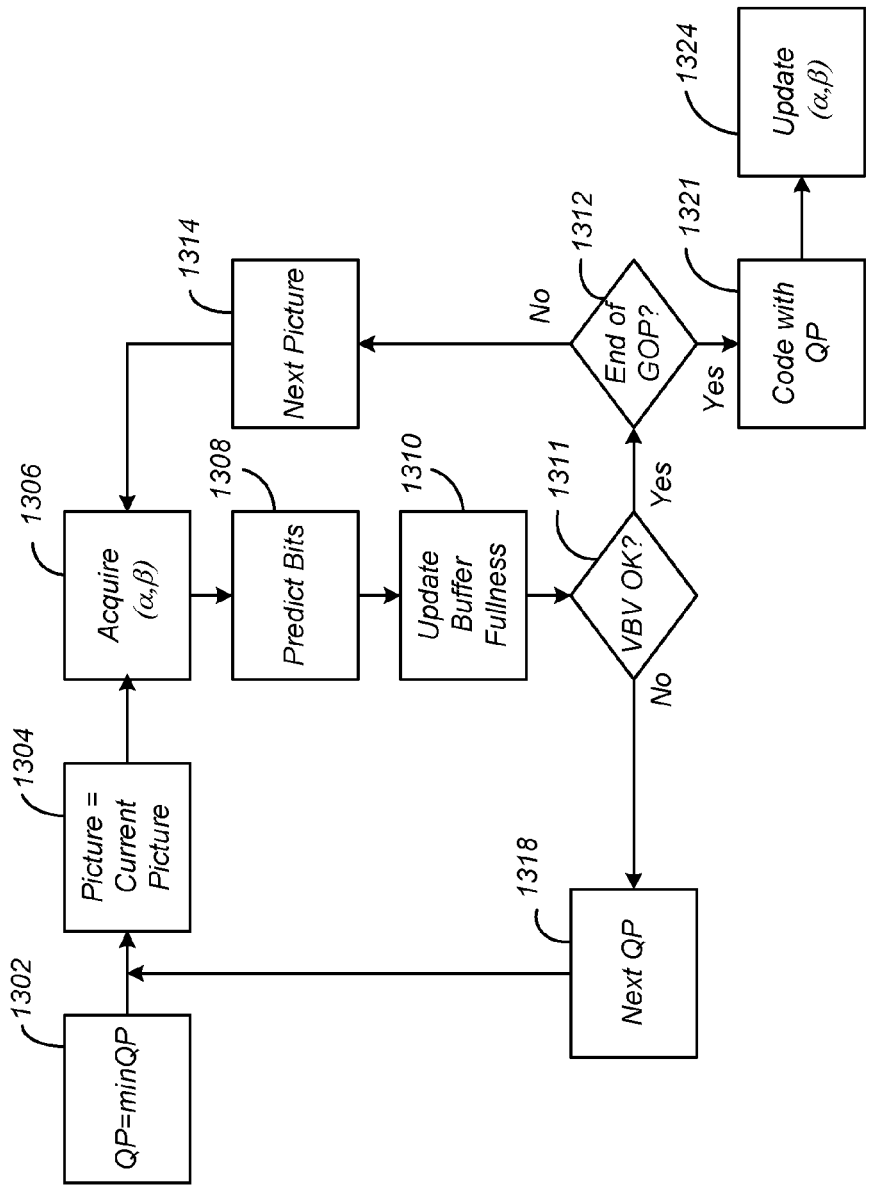

FIGS. 13A-13C each present a top level flowchart of an exemplary embodiment of a QP rate control method. FIGS. 13A-13C will be discussed with reference to FIG. 14, which is a diagram illustrating how VBV buffer fullness may be ascertained and analyzed.

Referring first to FIG. 13, an input sequence of pictures is divided into one or more windows of pictures, such as window 1402. Windows may be defined to represent pictures corresponding to a fixed period of time (e.g. one second or 1.5 seconds) or may be defined in terms of the number of pictures, or a group of pictures (GOP).

In block 1302, the quantization parameter QP is sent to an initial value. The initial QP value may be the QP value used for the most recently coded picture of the same layer as the current picture to be encoded. In block 1304, the picture to be predicted is set to the current picture, which is of a particular picture type. Initially, this is the first picture in the window of pictures. In block 1306, the value for parameters $\alpha$ and $\beta$ for the particular type of picture of the current picture are determined. The first picture of the window 1402 of pictures can be set to initial values for ($\alpha$, $\beta$) which are different for each picture type, and may be determined by training through a large set of test picture sequences, and are later updated after coding a picture, as described further below with respect to block 1324.

For a current picture within a window 1402 of pictures, we use the corresponding QR models of equations (1) or (2) to estimate or predict the bits required to encode the current picture as well as the bits for the future pictures within the same window 1402 and use the estimated bits to evaluate the VBV buffer fullness. Specifically, this can be accomplished by estimating a number of bits R needed to encode a current picture of picture type T according to:

$$R_{cur} = e^{\frac{Q_{cur_T} - \alpha_{cur_T}}{\beta_{cur_T}}} \qquad \text{Equation (2')}$$

wherein:
$Q_{cur_T}$ is a value of $Q_T$ of the current picture of type T;
$\alpha_{cur_T}$ is a value of $\alpha_T$ of the current picture of type T;
$\beta_{cur_T}$ is a value of $\beta_T$ of the current picture of type T;
and estimating a number of bits $R_i$ needed to encode each remaining picture i of the window of M pictures of picture type T according to:

$$R_i = e^{\frac{Q_{i_T} - \alpha_{i_T}}{\beta_{i_T}}} \qquad \text{Equation (2'')}$$

wherein:
$Q_{i_T}$ is a value of $Q_T$ of each remaining picture i of type T;
$\alpha_{i_T}$ is a value of $\alpha_T$ of each remaining picture i of type T;
$\beta_{i_T}$ is a value of $\beta_T$ of each remaining picture i of type T;

This is shown in blocks 1308-1314 of FIG. 13. Specifically, these operations include predicting the number of bits in the current picture, as shown in bock 1308. This prediction or estimation is made using the corresponding QR model and QP value under consideration for the current picture. Initially, the QP value used to estimate the number of bits required to encode the picture may be determined for the most recently coded picture of the same picture type, as described above with respect to block 1302.

Next, it is determined, for the current picture and each remaining picture i of the window of M pictures and from the estimated number of bits to needed to encode the current picture $R_{cur}$ and the estimated number of bits needed encode each remaining picture i of the window of M pictures, if a maximum video buffer boundary $B_{upper}$ or a minimum video buffer boundary $B_{low}$ are exceeded. If the maximum video buffer boundary $B_{upper}$ or the minimum video buffer boundary $B_{low}$ are exceeded, adjusting $Q_{cur_T}$ for the current picture of picture type T and $Q_{i_T}$ of each remaining picture i of picture type T, and repeating the estimating and determining steps, and if the maximum video buffer boundary $B_{upper}$ and the minimum video buffer boundary $B_{low}$ are not exceeded, designating $Q_{cur_T}$ as a value for coding the current picture.

To accomplish this, the VBV buffer fullness is computed, as shown in block 1310. This fullness computation (described further below) is computed from the estimated bits for the current picture, the estimated bits remaining in the VBV buffer for pictures previous to the current picture, and the estimated bits emptied from the VBV buffer.

Next, block 1312 determines if the current picture is the last picture of the window 1402 of pictures (e.g. the end of the window has been reached and all pictures in the window have been considered). If the current picture is not the last picture of the window 1402 of pictures, block 1312 routes processing to 1314 for consideration of the (temporally) next picture. In the illustrated embodiment, the window was selected to be a GOP in length, hence, processing is routed to block 1314 if the current picture is not the last picture of the GOP.

The process begins anew for the next picture type, with block 1306 acquiring the values for (α, β) and QP for the picture type of the (now) current picture. If the next (and now current) picture is the first picture of the window of pictures of its type, initial values may be used for (α, β) for that picture type. If the next (and now current) picture is not the first picture of the window 1402 of pictures of its type, the values of (α, β) for previously coded pictures of the same type may be used.

If the next (and now current) picture is of the same type as the previous current picture, the next (and now current) picture can use the same value for QP as the previous current picture. However, if the next (and now current) picture is of a different type, the QP for this picture may be different than the QP for the previous current picture, as described further below.

In one embodiment, the QP for each picture type differs from the QP for the I picture type by an offset. One such offset relationship may be, for example:

$$QP_I = QP_{Bs} - 1 = QP_{bs} - 2 = QP_b - 3 \qquad \text{Equation (3)}$$

In this example, because reference pictures (type I) have a lower QP value than anchor pictures of type (Bs), pictures of type I are quantized less (e.g. finer quantization steps are employed) than anchor pictures of type Bs. Similarly, anchor pictures of type Bs are quantized more roughly (larger quantization steps) than those of type bs, which, in turn, are quantized more roughly than those of type (b).

Hence, the number of bits per picture are estimates for pictures temporally following the current picture within the same window using the same QP used that was used for the current picture, but offset by the appropriate amount to account for the picture type.

In another embodiment, the QP value for all picture types is the same, and the same QP is used for all pictures, regardless of picture type. This may be advantageous because in estimating the number of bits in a picture, the use of offsets can lead to smaller QP values, which predict too many bits for I pictures, which can result in VBV buffer underflow conditions. To prevent such conditions, the same QP values may be used for all pictures regardless of picture type in the corresponding QR models used to estimate the bits of the pictures in the window 1402, and the selected QP value determined by comparison of the estimated bits to VBV buffer fullness requirements.

Block 1316 determines if all of the candidate QP values have been considered. If not, processing is routed to block 1318, which presents the next candidate QP value for the first picture in the window of pictures (which may be incremented or decremented from the previous candidate QP value), and the process described by blocks 1304-1316 is repeated for the next candidate QP value.

The result of this iterative process is to obtain a number of values for VBV buffer fullness as a function of QP. This is described further with respect to FIG. 14 below. Those buffer fullness values can be examined to choose the optimal value for QP, as shown in block 1320. Typically, this optimal value is constrained in that it must not result in any VBV buffer overflow or underflow for the window of pictures. Since more than one QP value may result in no VBV buffer overflows or underflows, the optimal QP may be selected as one that minimizes the total number of bits in the bitstream (but without an underflow condition), one that maximizes the total number of bits in the bitstream (but without an overflow condition), or some compromise between these two cases.

In any case, block 1320 chooses the optimal QP based on the optimization criteria. Then, the candidate picture is coded with the selected optimal QP, as shown in block 1322. After this process is complete, the parameter values for (α, β) are updated, as described further below.

The embodiment shown in FIG. 13A estimates the VBV buffer fullness for all candidate values of QP, then selects the optimal QP value based on that buffer fullness. FIG. 13B is a flow chart of another embodiment, in which the process of evaluating potential QPs is aborted and a new QP examined any time the VBV buffer fullness criteria is not met. Hence, after the VBV buffer fullness is evaluated for each picture (the first picture and each succeeding "next" picture), a check is made to determine if the VBV buffer fullness constraints are satisfied. If either constraint (not exceeding the maximum buffer fullness or falling below the minimum buffer fullness) is not met, the candidate QP value is eliminated from contention, and the next QP candidate is evaluated.

Specifically, after the number of bits in the picture is predicted as shown in block 1308 and the VBV buffer fullness is determine as shown in blocks 1310 as before, block 1311 determines whether the VBV buffer fullness has been exceeded, considering all of the pictures in the window 1402 from the initially current picture selected in bock 1304 up to the current picture under consideration. If the VBV buffer fullness constraints are not satisfied, no further pictures in the window are considered with the current value for QP, and instead, processing is routed to block 1318, which considers the next picture. If the VBV buffer constraints are satisfied, however, processing is routed to block 1312, which determines if all of the pictures in the window 1402 have been considered. If not, the next picture is evaluated as shown in block 1314 and the routing of processing to block 1306.

However, if the last picture in the window of pictures 1402 has been considered (as shown in block 1312), processing is routed to block 1316, which determines whether all of the candidate QPs have been considered. If not, processing is routed to block 1318, which selects the next candidate QP and routes processing to block 1304. If all of the candidate QPs have been considered, the optimal QP of those QPs that did not result in VBV buffer fullness constraints is selected as the optimal QP, as shown in block 1320. The current picture is then coded with the optimal QP resulting from the foregoing process, and the parameter values for (α, β) are updated, as shown in blocks 1322 and 1324.

FIG. 13C is a flow chart of still another embodiment, in which the process of evaluating potential QPs is aborted and a new QP is examined any time the VBV buffer fullness criteria is not met. Hence, after the VBV buffer fullness is evaluated for each picture (the first picture and each succeeding "next" picture), a check is made to determine if the VBV buffer fullness constraints are satisfied. If either constraint (not exceeding the maximum buffer fullness or falling below the minimum buffer fullness) is not met, the candidate QP value is eliminated from contention, and the next QP candidate is evaluated. Specifically, after the number of bits in the picture is predicted as shown in block 1308 and the VBV buffer fullness is determine as shown in blocks 1310 as before, block 1311 determines whether the VBV buffer fullness has been exceeded, considering the all of the pictures in the window 1402 from the initially current picture selected in bock 1304 up to the current picture under consideration. If the VBV buffer fullness constraints are not satisfied, no further pictures in the window are considered with the current value for QP, and instead, processing is routed to block 1318, which considers the next picture. If the VBV buffer constraints are satisfied, however, processing is routed to block 1312, which determines if all of the pictures in the window 1402 have been considered. If not, the next picture is evaluated as shown in block 1314 and the routing of processing to block 1306. However, if the last picture in the window of pictures 1402 has been considered (as shown in block 1312), the current picture (selected in block 1304) is coded and the parameter values for ($\alpha$, $\beta$) are updated, as shown in block 1324. In this case, the operations performed in block 1321 simply selects the current QP as the QP to be used in encoding the current picture.

Computing VBV Fullness

Figure 14:
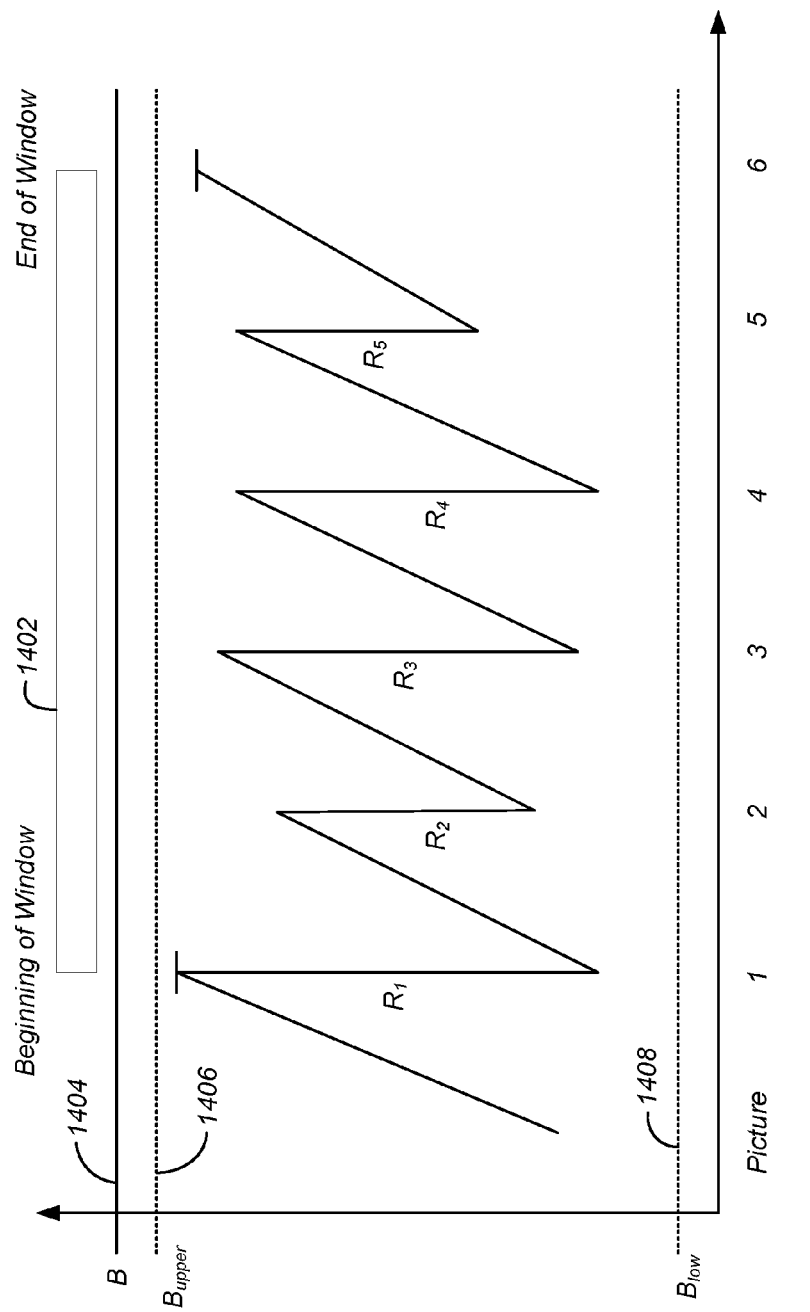
FIG. 14 is a diagram illustrating how the video buffering verifier (VBV buffer) fullness may be ascertained and analyzed.

Referring again to FIG. 14, further details regarding the operations of block 1310 are discussed below. FIG. 14 illustrates the number of bits in the VBV plotted for a window 1402 of six pictures (e.g. pictures 1, 2, 3, 4, 5 and 6).

The VBV is a theoretical HEVC video buffer model that is used by the encoder 202 to ensure that the video stream produced by the encoder 202 can be correctly buffered and played back at the decoder 220. The receiver decoder 260 in the decoder 220 should not overflow or underflow when presented with an HEVC compliant bitstream. The encoder 202 includes the VBV buffer to model the effects of the bitstream on the receiver buffer 259 to assure that such overflow or underflow does not occur in HEVC compliant decoders 220.

The VBV has two operational modes: (1) constant bit rate (CBR) and variable bit rate (VBR). In the CBR model, data to is provided to the VBV at a constant bit rate, while in the VBR model, data is provided to the VBV at a variable bit rate.

Operation of the VBV may be tied to two transmitted values, vbv_buffer_size_value, vbv_delay. Vbv_buffer_size_value refers to the maximum buffer fullness, and vbv_delay refers to the delay between storing a picture start code in the buffer and starting the decoding of that picture. Vbv_buffer_size and vbv_delay are both transmitted in every sequence header. The sequence header and vbv_buffer_size may not be available when tuning to a program in progress. However, proper operation of the decoder buffer can be obtained by use of the System Time Clock and various time stamps and an apriori knowledge of the maximum buffer size that may be required, so that vbv_delay and vbv_buffer size are redundant.

In the ATSC standard A/53 Annex A, the constraint on buffer size is maximum video buffer=B=7995392 bits, which is specified by transmitting:

vbv_buffer_size_value<=488 (lower 10 bits of vbv_buffer_size)

vbv_buffer_size_extension=0 (upper 8 bits of vbv_buffer_size)

where B=16*1024*vbv_buffer_size. The ATSC constraint on vbv_delay is vbv_delay<=45000. Vbv_delay is a 16 bit unsigned integer representing the number of 90 kHz clock periods between entering a picture's start code into the buffer and removing and decoding the entire picture.

An algorithm for determining VBV buffer fullness now described. We consider picture 1 as the current picture, and pictures 2, 3, 4 and 5 are the future pictures within the same window 1302. $R_1$, $R_2$, $R_3$, $R_4$, and $R_5$ are the corresponding estimated bits for pictures 1, 2, 3, 4, and 5 using the QP plus the corresponding QP offset values. The estimated bits, $R_1$, $R_2$, $R_3$, $R_4$, and $R_5$ are be checked to see if they cause any issue with the VBV.

Let B denote the VBV buffer size, $B_{low}$ ($\geq 0$) 1408 denote the lower boundary of the permitted VBV buffer fullness for pictures in the window 1402, and $B_{upper}$ ($\leq B$) 1406, as shown in FIG. 14. Further, let $R_{e_i}$ denote the estimated bits for pictures i=1, 2, . . . using the corresponding QR models (e.g. the a base QR for I type pictures and the QR of the other picture types as described in Equation (3)).

Also, let $$R_{pic\_nominal} = \frac{bit\_rate}{pic\_rate}$$

where bit_rate is the bit rate of the pictures in the window 1402 and pic_rate is the rate of pictures in the window. Accordingly $R_{pic\_nominal}$ represents the nominal number of bits per picture of the pictures in the window 1402. Finally, let $B_{i-}$ and $B_{i+}$ denote the estimated VBV fullness immediately before and after picture i, respectively.

There is an initial VBV delay right before the first picture of the window of pictures 1402 that are to be decoded. For example, the initial VBV delay can be set to 1 or 2 seconds, which means the VBV is filled with 1 or 2 seconds worth of bits before the first picture is decoded.

To meet the VBV fullness criteria, for each picture i within the current window 1402, the following relationships must be satisfied at the indicated times:

(1) immediately before picture i:

$$B_{i-}=B_{(i-1)+}+R_{pic\_nominal}<B_{upper} \quad \text{(Equation 4)}$$

and (2) immediately after picture i:

$$B_{i+}=B_{i-}-R_{e_i}>B_{low} \quad \text{Equation (5)}$$

If Equations (4) and (5) are satisfied for each picture i in the window of pictures 1402, the QP used in computing the estimated number of bits is satisfactory, and can be used for the current picture, or picture "1" of FIG. 14. Otherwise, the value for QP for each type is adjusted, and the process of estimating the number of bits per picture in the window 1402 is performed, each time estimating the VBV fullness criteria of Equations (4) and (5). This is analogous to the flow chart of FIG. 13C.

Alternatively, the buffer fullness vales $B_{i-}$ and $B_{i+}$ may be determined for a plurality of candidate QPs, and the optimum value for QP selected, subject to the constraint that the buffer fullness criteria (of equations (4) and (5)) for the current picture and all other pictures in the window of pictures is satisfied, as shown in FIGS. 13A and 13B.

Updating Parameter Values for ($\alpha$, $\beta$)

Referring back to FIGS. 13A-13C, after coding the current picture using the selected QP for the current picture, the parameter pair ($\alpha$, $\beta$) of the corresponding QR model is updated, as shown in block 1324. This may be accomplished by implementing an iterative binary search algorithm to update the parameter pair ($\alpha$, $\beta$) as further described below.

Let $\alpha_{min}$ and $\alpha_{max}$ be the minimum and maximum values of parameter a, and $\beta_{min}$ and $\beta_{max}$ be the minimum and maximum values of parameter b. For example, let:

$\alpha_{min}$=1.12
$\alpha_{max}$=26.28
$\beta_{min}$=−12.6
$\beta_{max}$=−0.42

Further, let $R_r$ denote the actual number of bits used to code the current picture i using QP value computed using a current parameter pair ($\alpha$, $\beta$). Note that $R_r$, the actual number of bits used may not be the same as (and will typically be different than) the estimated number of bits to code the picture which is defined according to Equation (6)

$$R_e(\alpha, \beta) = e^{\frac{Q-\alpha}{\beta}} \qquad \text{Equation (6)}$$

The parameter pair ($\alpha$, $\beta$) can be updated by an iterative process by which if the distance between the actual number of bits of the picture and the estimated number of bits of the picture is less than a threshold value E, the parameter pair ($\alpha$, $\beta$) is not updated, but if the distance between the actual number of bits of the picture and the estimated number of bits of the picture exceeds the threshold value E, the parameter pair ($\alpha$, $\beta$) is updated. This can be implemented using the following iterative procedure.

Step One: Initially, for a picture type T, set:
j=0
$\alpha_{j_T} = \alpha_{cur_T}$;
$\beta_{j_T} = \beta_{cur_T}$;
$\alpha_L = \alpha_{min_T}$;
$\beta_L = \beta_{min_T}$;
$\alpha_H = \alpha_{max_T}$;
$\beta H = \beta_{max_T}$;

Step Two: Determine if $\alpha_{j_T}$ and $\beta_{j_T}$ satisfy the condition $$\left| e^{\frac{Q_{j_T} - \alpha_{j_T}}{\beta_{j_T}}} - R_r \right| < \varepsilon,$$

where $\varepsilon$ is a very small positive number (for example, $\varepsilon$=0.01), the current values for the parameter pair ($\alpha$, $\beta$) are sufficiently close to the ideal value. Hence, the parameter pair $\alpha_T$ and $\beta_T$ is updated as the current values for $\alpha_{j_T}$ and $\beta_{j_T}$, and the updating process of block 1324 is completed. If $\alpha_{j_T}$ and $\beta_{j_T}$ does not satisfy the condition $$\left| e^{\frac{Q_{j_T} - \alpha_{j_T}}{\beta_{j_T}}} - R_r \right| < \varepsilon,$$

proceed to Step Three.

Step Three: Determine if the actual number of bits required to code the picture is less than the predicted number of bits, but greater than the expected number of bits if the parameter pair ($\alpha$, $\beta$) were at their minimum values. Specifically, if the condition expressed in Equation (7) is satisfied:

$$e^{\frac{Q_{j_T} - \alpha_{L_T}}{\beta_{L_T}}} < R_r < e^{\frac{Q_{j_T} - \alpha_{j_T}}{\beta_{j_T}}} \qquad \text{Equation (7)}$$

Then the following actions are performed, and Step Two is repeated:

set $\alpha_H = \alpha_{j_T}$;
set $\beta_H = \beta_{j_T}$;
compute $\alpha_{j+1_T} = \frac{\alpha_L + \alpha_H}{2}$;
compute $\beta_{j+1_T} = \frac{\beta_L + \beta_H}{2}$;
set $j = j + 1$.

If the condition expressed in Equation (7) is not satisfied, Step Four (below) is performed.

Step Four: Determine if the actual number of bits required to code the picture is greater than the predicted number of bits, but less than the expected number of bits if the parameter pair ($\alpha$, $\beta$) were at their maximum values. Specifically, if the condition expressed in Equation (8) is satisfied:

$$e^{\frac{Q_{j_T} - \alpha_{j_T}}{\beta_{j_T}}} < R_r < e^{\frac{Q_{j_T} - \alpha_{H_T}}{\beta_{H_T}}} \qquad \text{Equation (8)}$$

Then the following actions are performed, and Step Two is repeated:

set $\alpha_L = \alpha_{j_T}$
set $\beta_L = \beta_{j_T}$
compute $\alpha_{j+1_T} = \frac{\alpha_L + \alpha_H}{2}$
compute $\beta_{j+1_T} = \frac{\beta_L + \beta_H}{2}$
set $j = j + 1$.

The updated parameter pair ($\alpha$, $\beta$) is then used in selecting the QP value for the next picture of the same type.

Figure 15:
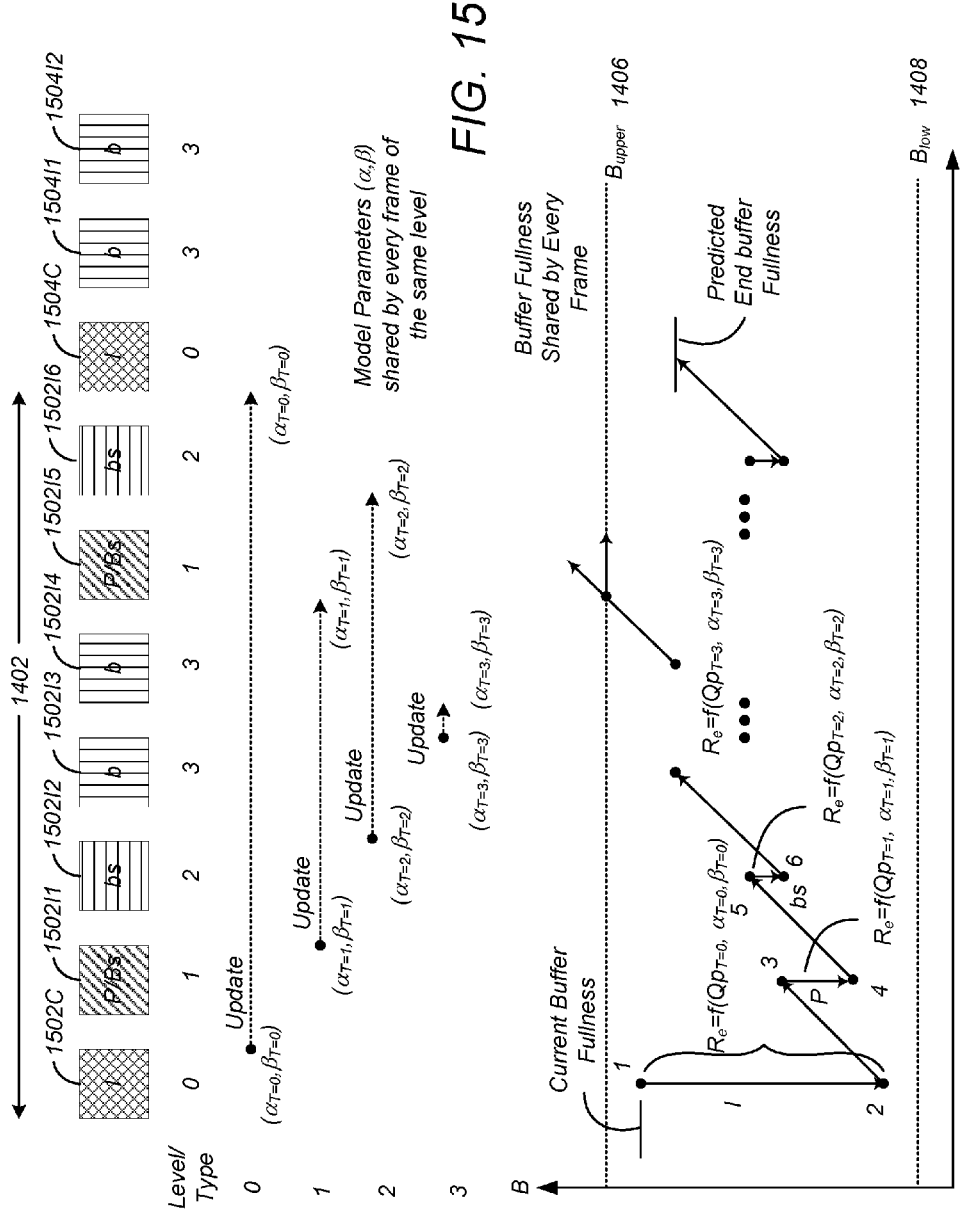
FIG. 15 is a diagram illustrating a technique used to estimate buffer fullness for a window of pictures.

FIG. 15 is a diagram illustrating the foregoing processes to estimate buffer fullness for a window 1402 of pictures 1502. The window 1402 of pictures 1502 includes a current picture 1502C as well as further pictures 1502I1-1502I6 in the window 1402. The pictures 1502 include I or I-type pictures (also indicated as type 0), P or Bs type pictures (also indicated as type 1), bs type pictures (also indicated as type 2) and b-type pictures (also indicated as type 3). The lower plot of FIG. 15 illustrates the estimation of the buffer fullness estimation for the coding of current picture 1502C. First, the bits required to encode the current picture is estimated according to $R_e = f(Qp_T, \alpha_T, \beta_T)$ using Equation (6) above, where T=0 (since the current picture is an I-type picture (type zero)). Using this value for $R_e$, and the current fullness of the VBV buffer is checked according to Equation (4). In the example shown in FIG. 15, the fullness of the VBV buffer immediately before the picture i (the current picture 1502C) is less than the upper maximum VBV buffer fullness. Next, the VBV buffer fullness is checked to assure it is above the minimum value, using Equation (5). As shown by the second dot on the lower portion of FIG. 15, the condition is satisfied.

The parameter pair ($\alpha$, $\beta$) for the same picture type (I) can then be updated using the procedures described above. As shown in the upper portion of FIG. 15, this parameter pair will not be used until the next time the current picture is an I-type picture. In cases where the window of pictures 1402 is selected as a GOP, this means the parameter set for the I-type pictures may be skipped, as the updated parameter set will not be used.

Figure 16:
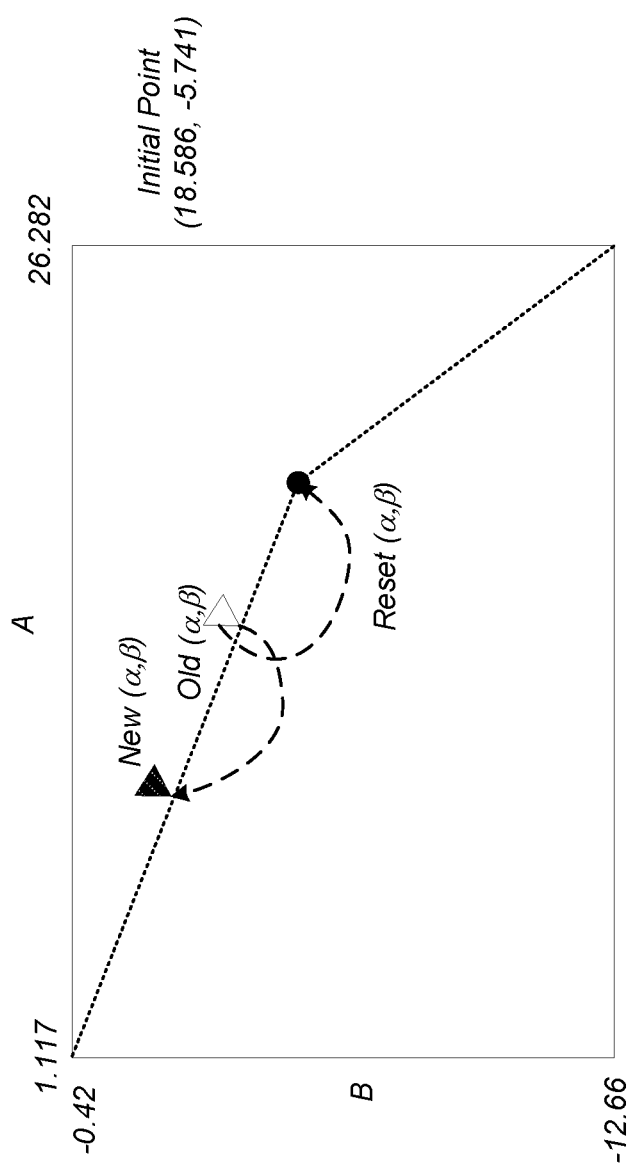
FIG. 16 is a diagram illustrating the updating the parameter pair (α, β) from old values to new values.

FIG. 16 is a diagram illustrating the updating the parameter pair ($\alpha$, $\beta$) from old values to new values. The parameter pair ($\alpha$, $\beta$) values may also be reset under some circumstances, such as in response to a scene change, as further discussed below.

Next, the estimated bits for the next picture are estimated. In this case, the picture is a P/Bs type (type 1), so this is accomplished by computing $R_e=f(Qp_T, \alpha_T, \beta_T)$ using Equation (6) above, where T=1 (since the current picture is an P/Bs-type picture (type zero)). Using this value for $R_e$, the current fullness of the VBV buffer is checked according to Equation (4). In the example shown in FIG. 15, the fullness of the VBV buffer immediately before the picture i (the current picture is denoted by the third dot in the lower portion of FIG. 15, and is also less than the upper maximum VBV buffer fullness. Next, the VBV buffer fullness is checked to assure it is above the minimum value, using Equation (5). As shown by the fourth dot on the lower portion of FIG. 15, the condition is satisfied.

The parameter pair ($\alpha$, $\beta$) for the same picture type (P/Bs) can then be updated using the procedures described above. As shown in the upper portion of FIG. 15, this parameter pair will not be used until the next time the current picture is an P/Bs-type picture, which is picture 1502I5.

The estimated bits for the next picture are estimated. In this case, the picture is a bs type (type 2), so this is accomplished by computing $R_e=f(Qp_T, \alpha_T, \beta_T)$ using Equation (6) above, where T=2 (since the current picture is an bs-type picture (type zero)). Using this value for $R_e$, and the current fullness of the VBV buffer is checked according to Equation (4). In the example shown in FIG. 15, the fullness of the VBV buffer immediately before the picture i (the current picture is denoted by the fifth dot in the lower portion of FIG. 15, and is also less than the upper maximum VBV buffer fullness. Next, the VBV buffer fullness is checked to assure it is above the minimum value, using Equation (5). As shown by the 6th dot on the lower portion of FIG. 15, the condition is satisfied.

The parameter pair ($\alpha$, $\beta$) for the same picture type-bs can then be updated using the procedures described above. As shown in the upper portion of FIG. 15, this parameter pair will not be used until the next time the current picture is a bs-type picture, which is picture 1502I6.

This process is repeated for the remaining pictures in the window of pictures 1402.

If the VBV buffer fullness exceeds the maximum value $B_{upper}$, as shown in 1406 (or falls below the minimum value $B_{low}$ (not pictured), updated values for Qp may be computed for each picture type, and the computation began anew from the first dot of the lower portion of FIG. 15. The current values for parameter pair ($\alpha$, $\beta$) (instead of the initial values) are used, since they reflect the accuracy of Equation (6) in estimating the number of bits per picture, and this information is still valid, even for new values of Qp. If the predicted buffer fullness after each picture 1502 of the window of pictures 1402 has been considered, the currently set Qp value (used to evaluate pictures 1502C and 1502I1-1502I6) may be used to encode the current picture 1502C.

This process can be used to implement any of the embodiments depicted in FIGS. 13A-13C.

Further Implementation Details

The selected QP value for a current picture i−1 should not cause VBV overflow. However, in the event that the estimated bits for the current picture i−1 using the corresponding QR model results in VBV overflow (that is, $B_{i-}=B_{(i-1)+}+R_{pic\_nominal}>B_{upper}$) for all for all the QP values, the smallest allowed QP value for the current picture i may be used.

Likewise, the selected QP value for a current picture i should not cause VBV underflow. If the estimated bits for the current picture i using the corresponding QR model results in VBV underflow (that is, $B_{i+}=B_{i-}-R_i<B_{low}$), for all the QP values, the largest allowed QP value for the current picture i may be used.

For a current picture i, if the resulting coded bits of the previous picture i−1 indeed resulted in a VBV overflow, reset the VBV buffer fullness right before the current picture i to the VBV buffer size (that is, $B_{(i+1)-}=B_{upper}$) when coming to evaluate the VBV and determine a QP value for the current picture i.

Since I-type pictures are expected to generate more bits than other type pictures, including inter pictures, Bs-type pictures, bs-type pictures and b-pictures, immediately before an I-type picture, it is advantageous to maintain the VBV buffer fullness close to the upper maximum value ($B_{upper}$). That is:

$$B_{i-}=B_{(i-1)+}+R_{pic\_nominal}\approx B_{upper} \qquad \text{Equation (9)}$$

In the case where more than one QP satisfy the VBV constraints of Equation (4) and (5), an optimal QP may be chosen, as described above. In one embodiment, the optimal QP is chosen as the QP that results in the VBV buffer fullness at the end of the window closest to a desired buffer fullness level. In cases where the window 1402 is a GOP, the next picture in the following GOP will be an I-type picture, and hence, the chosen QP may be the QP that results in a VBV buffer fullness close to the upper value ($B_{upper}$).

Resetting the Parameter Pair ($\alpha$, $\beta$) of the QR Models for Non-Intra Pictures According to CU-Type Population (592)

Special consideration may be made for non-intra (e.g. inter) picture types. The bits for such non-intra pictures estimated using Equation (6) may be inaccurate, leaving to VBV underflow conditions. In particular, for such non-intra pictures, if the majority of the CUs in the picture are intra CUs, the number of bits is not well represented by Equation (6). This is because intra CUs have different characteristics than other frames of the same type.

This problem may be ameliorated by determining the number of intra blocks or CUs comprise more than a threshold percentage of the blocks or CUs in the picture, and if so, resetting the parameter pair ($\alpha$, $\beta$) values to the initial values instead of updating the parameter pair ($\alpha$, $\beta$).

Exclusive Processing for Parameter Pairs ($\alpha$, $\beta$) of the QR Models in Pictures Processed in Parallel (593)

HEVC includes the capability for parallel processing of pictures. Such capacity includes enhancements for both encoding and decoding, and impacts tile processing, in-loop deblocking filter processing, and wavefront parallel processing.

Tiles allow for a picture to be divided into a grid of rectangular regions that can be independently decoded and encoded simultaneously. They also enable random access to specific regions of a picture in a video stream.

In-loop deblocking filters have been defined such that it only applies to edges aligned on an 8×8 grid in order to reduce the number of interactions between blocks and simplify parallel processing methodologies. Additionally, the processing order has been specified as horizontal filtering on vertical edges followed by vertical filtering of horizontal edges. This allows for multiple parallel threads of deblocking filter calculations to be run simultaneously.

Finally, wavefront parallel processing (WPP) allows each slice to be broken into coding tree units (CTUs) and each CTU unit can be decoded based on information from the preceding CTU. The first row is decoded normally but each additional row requires decisions be made in the previous row.

In such parallel processing of pictures, the parameter pair $(\alpha, \beta)$ values shared by pictures of the same level (e.g. type) may be updated during the encoding of the current picture. Consequently, the parameter pair $(\alpha, \beta)$ values actually used for encoding could be different than the updated parameter pair $(\alpha, \beta)$ values for a different picture of the same type. In other words, since the models used for rate control are such that the model for a particular frame inherits the model parameters of the previously coded frame of the same level, when processing pictures in parallel, it is possible that the model processing parameters for a picture may be overwritten by the newly updated parameter pair $(\alpha, \beta)$ values obtained from the previously processed picture of the same type while the processing of the current picture is actually taking place.

FIGS. 17A and 17B are diagrams illustrating the temporal relationship between processing of adjacent pictures. Note that the processing of picture "1" begins at time "1" and is completed at time "4." Also note that the processing of picture "2" begins at time "3" and is completed at time "7." Hence, there is an interval in time (between time "3" and time "4") when both picture "1" and picture "2" are being processed. If the same memory structure is to save the parameter pair $(\alpha, \beta)$ values for all frames of the same type, the parameter pair $(\alpha, \beta)$ for frame "2" will be updated after the processing of picture "1," which is during the processing of picture "2."

This problem may be ameliorated by predicting the size of each picture using only the most recently available parameter pair $(\alpha, \beta)$ values from pictures of the same type. Hence, parameter pair $(\alpha, \beta)$ values for pictures of the same type that became available after the processing of the picture are not utilized in determining the size of the picture under consideration. This requires storing multiple versions of parameter pair $(\alpha, \beta)$ values for the same frame type (one for each frame being processed of the same type).

This solution is illustrated in FIG. 17B. As illustrated, frame "2" is processed with the parameter pair $(\alpha, \beta)$ values available when the processing of frame "2" begins. The updated parameter pair $(\alpha, \beta)$ values that result from the completion of the processing of frame "1" are not used in predicting the size of frame "2." Note that the processing of frame "3" begins after the processing of frame "1" has completed, so frame "3" may use the updated parameter pair $(\alpha, \beta)$ values obtained after the processing of frame "1" has completed. However, the parameter pair $(\alpha, \beta)$ obtained at time "7" (when the processing of frame "2" has completed) will not be used in the processing of frame "3."

Note that the situation posited in FIGS. 17A and 17B requires only two memory structures, because the processing of picture "1" has completed before the beginning of the processing of picture "3" begins. In this instance, the prediction of the number of bits in picture "3" will use the most recently updated parameter pair $(\alpha, \beta)$ values, which are obtained from the processing of picture "1". Hence, the minimum number of memories required to store parameter pair $(\alpha, \beta)$ values for each type of picture being processed is equal to the number of pictures of the same type being processed in parallel. More independent memories may be provided for purposes of simplifying processing if desired.

Predicting Size of Previous Pictures Processed in Parallel in Computing Buffer Level (593)

Figure 18A:
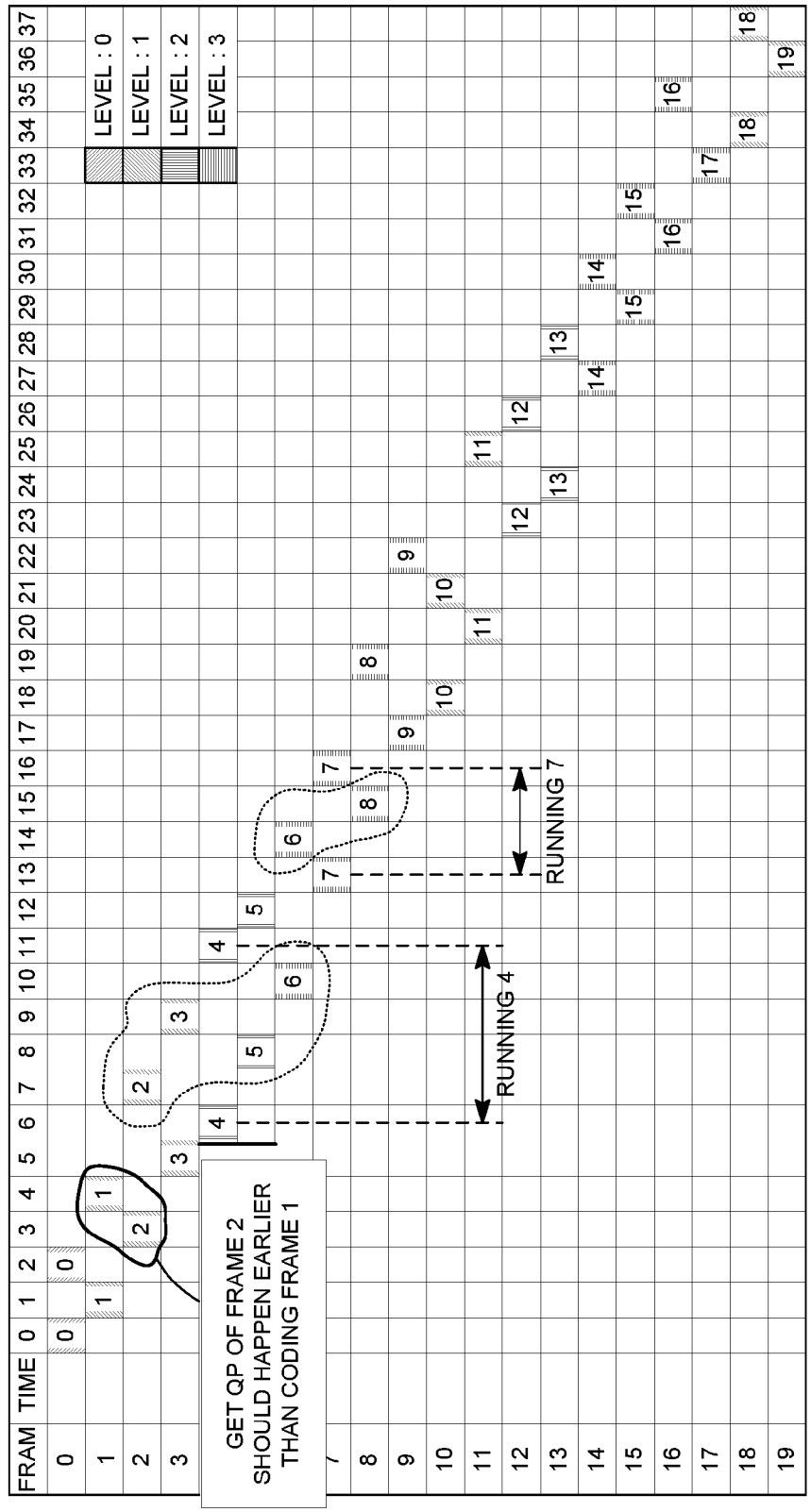
FIGS. 18A-18C are diagrams illustrating how parallel processing may effect VBV buffer fullness estimation.
Figure 18B:
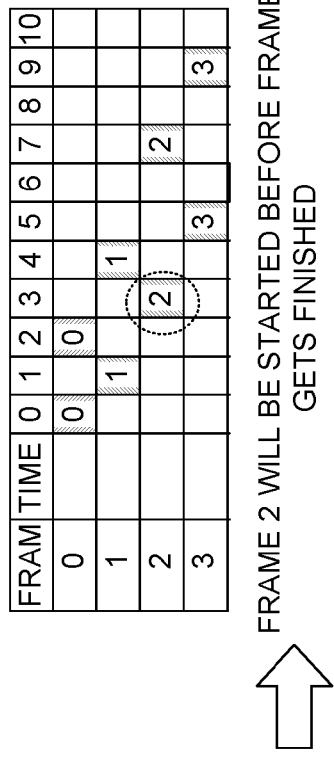

FIGS. 18A and 18B are diagrams illustrating how parallel processing may effect VBV buffer fullness estimation. As shown in FIG. 18A, because of parallel processing, the processing needed to estimate the number of bits of picture 2 may begin before the processing needed to estimate the number of bits of picture 1 has been completed. As shown in FIG. 18B, this problem extends beyond frames of the same type, to frames of different types, because such frames may be processed in parallel as well.

Figure 18C:
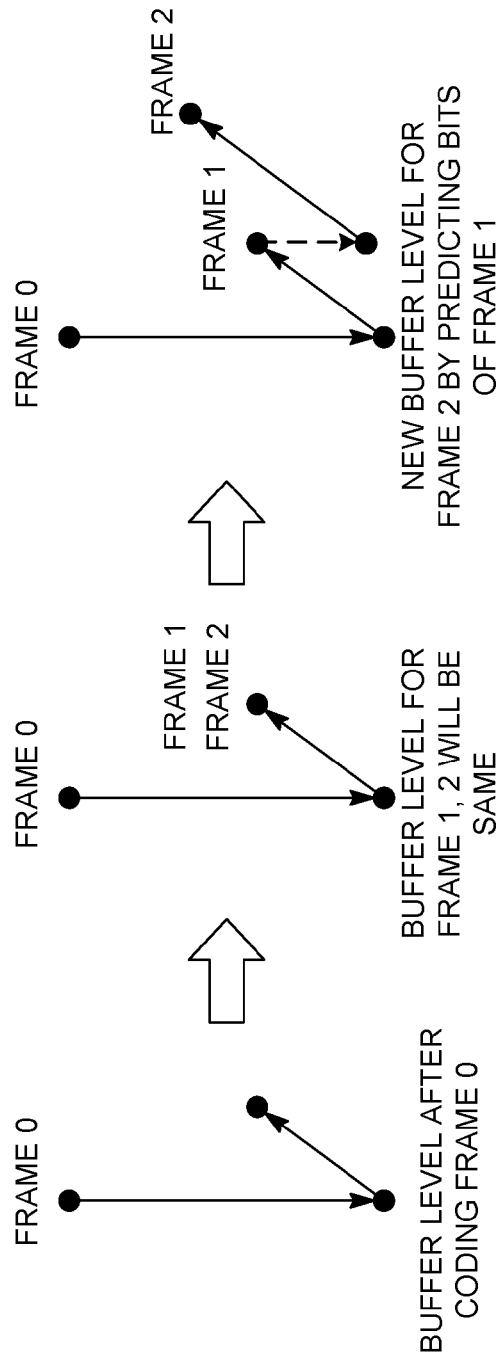

FIG. 18C is a diagram illustrating how this problem may be ameliorated. The leftmost portion of FIG. 18C illustrates the buffer level after the coding of frame 0. The center portion of FIG. 18C illustrates the predicted buffer levels for frames 1 and 2. If the frames are of similar complexity and of the same type (as illustrated in FIG. 18A), they will fill the buffer approximately the same amount, and the buffer fullness estimate for both frames 1 and frames 2 will be about the same. However, the estimated buffer fullness resulting from the parallel processing of frames 1 and 2 differ in that the missing bits of frame 1 must be considered in determining the buffer fullness due to frame 1, as shown in the rightmost portion of FIG. 18C. To more accurately determine the buffer level, the buffer level for frame 2 may be estimated by predicting the number of bits of frame 1.

Resetting the Parameter Pair $(\alpha, \beta)$ of the QR Models After Scene Changes The foregoing iterative update of parameter pair $(\alpha, \beta)$ values is ultimately based on the assumption that there is some level of correlation between the current frame and the next frame. However, there is little or no correlation between frames of an old scene and frames of a new scene. Accordingly, the estimate of the number of bits in a picture using the QR model and a parameter pair $(\alpha, \beta)$ iteratively estimated as described above will generally lead to an inaccurate estimation of the bits.

Since there is little or no correlation between the pictures of a new scene and pictures of an old scene, the parameter pair $(\alpha, \beta)$ values of the QR models of each type should be reset to their initial values if there is a significant scene content change between windows of pictures 1402 or within the window of pictures 1402. As described above, such initial values may be determined by training through a large set of test sequences.

Alternatively, parameter pair $(\alpha, \beta)$ values of the QR models of each type can be reset using statistics collected in a preprocessing or look-ahead process. That is:

$$\alpha = f(\text{stat}), \text{ and } \beta = g(\text{stat}) \qquad \text{Equation (10)}$$

Such functions may include a similarity (or conversely, distortion) metric such as the sum of absolute differences (SAD). The SAD may be defined as a difference between blocks $b_1$ and $b_2$, each having associated samples n and m, according to Equation (11).

$$D_{SAD} = \Sigma_{n=0}^{N-1} \Sigma_{m=0}^{M-1} |b_1(n,m) - b_2(n,m)| \qquad \text{Equation (11)}$$

Outlier Handling

As described above, pictures may vary significantly from neighboring pictures because of scene changes, or camera angle changes (e.g. in when two cameras are used to present a dialog between two actors). Such picture variation is a natural product of the scene and camera perspective changes that are typical in video programming.

However, pictures may vary significantly from neighboring pictures for reasons unrelated to scene and camera perspective changes. Such pictures are referred to hereinafter as "outlier" pictures. One example of an outlier picture is a badly-coded picture in a precoded sequence of pictures. Another example of an outlier picture is a picture in which a lightning or camera flash occurred, filling one picture with a flood of light that substantially alters the image. Such "outlier" pictures typically vary significantly from neighboring pictures, but are typically only one picture in length.

The QR relationship described in Equations (1) and (6) for outlier pictures differs substantially from for the QR relationship for the outlier picture's neighbor pictures. Coding of such outlier pictures may require a very different number of bits than its neighbor pictures even if a similar quantization parameter is used.

Since outlier pictures do not correlate well with neighboring pictures, it is undesirable to have outlier pictures affect the corresponding QR models of the pictures in the window 1402. A technique for preventing outlier pictures from affecting the QR models of other pictures of the window is presented below:

A determination is made regarding whether a statistic of the current picture differs from a statistic of one or more adjacent pictures by greater than a threshold value. In one embodiment, this is accomplished by determining if a sum of an absolute difference (SAD) value of the current picture is different than an average value of a sum of an absolute difference value of the one or more adjacent pictures exceeds a threshold value. For example, a current picture i may be considered to be an outlier if it's SAD value (SAD(i)) differs from the average SAD of it's two neighbors (e.g. SAD(i−1) and SAD(i+1) by more than a specific threshold. This may be determined according to Equation 12 below:

$$\frac{SAD(i) - \frac{SAD(i-1) + SAD(i+1)}{2}}{\frac{SAD(i-1) + SAD(i+1)}{2}} > T \qquad \text{Equation (12)}$$

Once a picture has been identified as an outlier picture, we may choose to determine the number of bits in the picture using Equation (2) (or to code that picture) using the quantization parameter QP assigned for the previous picture of the same type. For example if a Bs-type picture has been identified as an outlier picture, the QP assigned to the previous Bs-type picture would be utilized. For example, with respect to the current picture, the estimated bits may be expressed as:

$$R_{cur} = e^{\frac{Q_{prev\_cur_T} - \alpha_{cur_T}}{\beta_{cur_T}}} \qquad \text{Equation (13A)}$$

wherein the $Q_{prev\_cur_T}$ value of a previous picture of the current picture of the same type T, and with respect to the remaining pictures i in the window 1402, the estimated bits may be expressed as $$R_i = e^{\frac{Q_{prev_{i_T}} - \alpha_{cur_T}}{\beta_{cur_T}}} \qquad \text{Equation (13B)}$$

wherein $Q_{prev\_i_T}$ is a value of a previous of the remaining picture i of the same type T.

In one embodiment, an offset can be added to the QP assigned to the previous picture. This offset ($\Delta Q_{offset_T}$) for each type T can be associated with the statistics of the current outlier picture and its neighbor pictures as obtained from previous passes through the operations of FIGS. 13A-13C. In this case, the estimated bits can be expressed as:

$$R_{cur} = e^{\frac{(Q_{prev_{cur_T}} + \Delta Q_{cur\_offset_T}) - \alpha_{cur_T}}{\beta_{cur_T}}} \qquad \text{Equation (14A)}$$

wherein the $\Delta Q_{cur\_offset}$ offset is an offset determined at least in part according to the difference between the statistic of the current picture and the one or more pictures adjacent to the current picture, and $$R_i = e^{\frac{(Q_{prev\_i_T} + \Delta Q_{i\_offset_T}) - \alpha_{cur_T}}{\beta_{cur_T}}} \qquad \text{Equation (14B)}$$

wherein the $\Delta Q_{i\_offset}$ is an offset determined at least in part according to the difference between the statistic of the current picture and the one or more pictures adjacent to the current picture.

In addition, the QP used for outlier pictures and the resulting bits will not be used to update the corresponding QR models.

Hardware Environment

Figure 19:
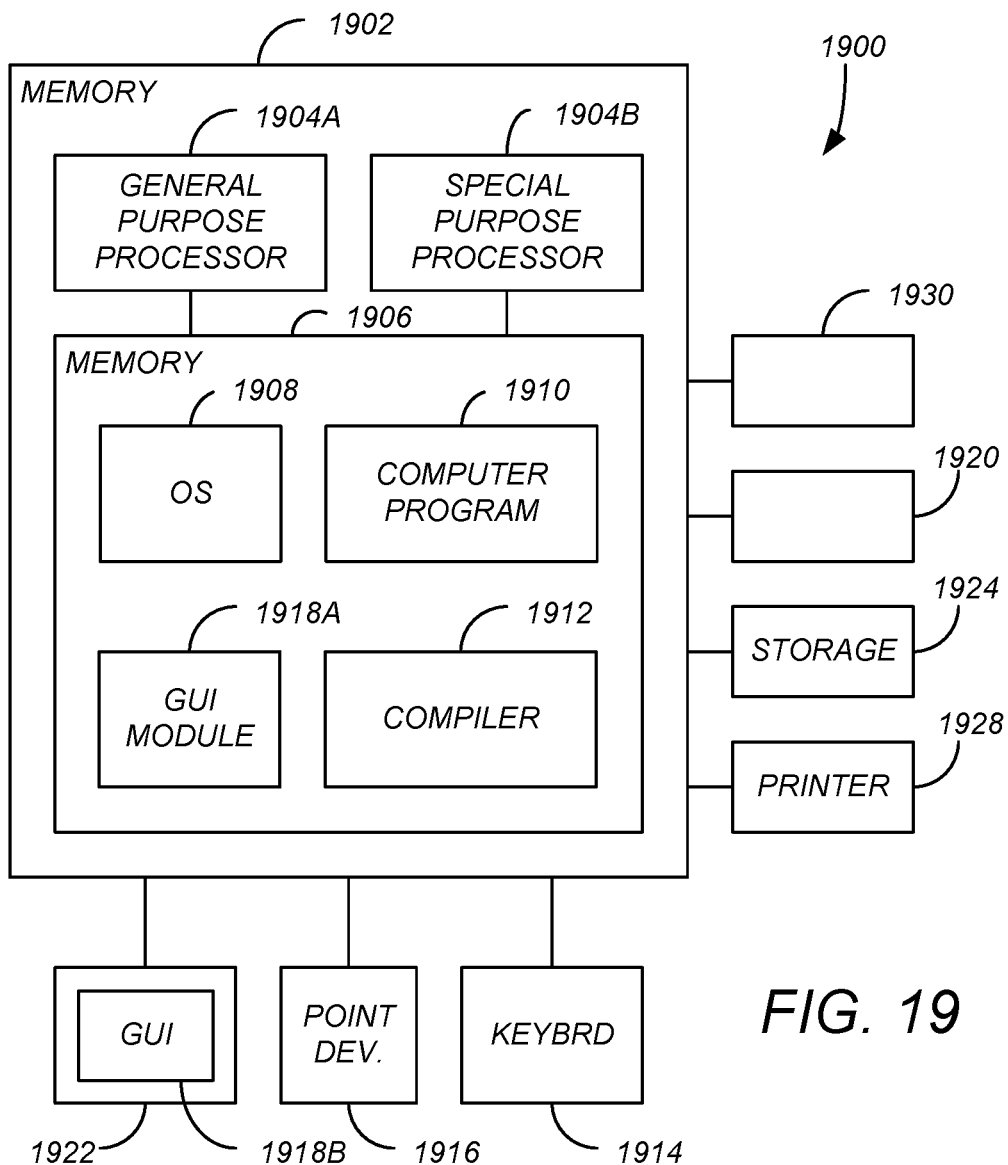
FIG. 19 is a diagram illustrating an exemplary computer system that could be used to implement elements of the present invention.

FIG. 19 is a diagram illustrating an exemplary computer system 1900 that could be used to implement elements of the present invention, including the encoding controller 208 or other device computing the relationship between encoding parameters and target decoding device decoding costs and selecting encoding parameters to minimize encoding costs including target decoding device decoding costs. The exemplary computer system 1900 may also be used to encode the uncoded video 102 according to the selected encoding parameters or to decode the coded video.

The computer 1902 comprises a general purpose hardware processor 1904A and/or a special purpose hardware processor 1904B (hereinafter alternatively collectively referred to as processor 1904) and a memory 1906, such as random access memory (RAM). The computer 1902 may be coupled to other devices, including input/output (I/O) devices such as a keyboard 1914, a mouse device 1916 and a printer 1928.

In one embodiment, the computer 1902 operates by the general purpose processor 1904A performing instructions defined by the computer program 1910 under control of an operating system 1908. The computer program 1910 and/or the operating system 1908 may be stored in the memory 1906 and may interface with the user and/or other devices to accept input and commands and, based on such input and commands and the instructions defined by the computer program 1910 and operating system 1908 to provide output and results.

Output/results may be presented on the display 1922 or provided to another device for presentation or further processing or action. In one embodiment, the display 1922 comprises a liquid crystal display (LCD) having a plurality of separately addressable pixels formed by liquid crystals. Each pixel of the display 1922 changes to an opaque or translucent state to form a part of the image on the display in response to the data or information generated by the processor 1904 from the application of the instructions of the computer program 1910 and/or operating system 1908 to the input and commands. Other display 1922 types also include picture elements that change state in order to create the image presented on the display 1922. The image may be provided through a graphical user interface (GUI) module 1918A. Although the GUI module 1918A is depicted as a separate module, the instructions performing the GUI functions can be resident or distributed in the operating system 1908, the computer program 1910, or implemented with special purpose memory and processors.

Some or all of the operations performed by the computer 1902 according to the computer program 1910 instructions may be implemented in a special purpose processor 1904B. In this embodiment, some or all of the computer program 1910 instructions may be implemented via firmware instructions stored in a read only memory (ROM), a programmable read only memory (PROM) or flash memory within the special purpose processor 1904B or in memory 1906. The special purpose processor 1904B may also be hardwired through circuit design to perform some or all of the operations to implement the present invention. Further, the special purpose processor 1904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1902 may also implement a compiler 1912 which allows an application program 1910 written in a programming language such as COBOL, C++, FORTRAN, or other language to be translated into processor 1904 readable code. After completion, the application or computer program 1910 accesses and manipulates data accepted from I/O devices and stored in the memory 1906 of the computer 1902 using the relationships and logic that was generated using the compiler 1912.

The computer 1902 also optionally comprises an external communication device such as a modem, satellite link, Ethernet card, or other device for accepting input from and providing output to other computers.

In one embodiment, instructions implementing the operating system 1908, the computer program 1910, and/or the compiler 1912 are tangibly embodied in a computer-readable medium, e.g., data storage device 1920, which could include one or more fixed or removable data storage devices, such as a zip drive, floppy disc drive 1924, hard drive, CD-ROM drive, tape drive, or a flash drive. Further, the operating system 1908 and the computer program 1910 are comprised of computer program instructions which, when accessed, read and executed by the computer 1902, causes the computer 1902 to perform the steps necessary to implement and/or use the present invention or to load the program of instructions into a memory, thus creating a special purpose data structure causing the computer to operate as a specially programmed computer executing the method steps described herein. Computer program 1910 and/or operating instructions may also be tangibly embodied in memory 1906 and/or data communications devices 1930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1902.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of controlling a bit rate of an encoded video comprising a plurality of pictures, each of the plurality of pictures being of one of a plurality of picture types, comprising:
   (a) defining a window of M pictures comprising a plurality of window pictures;
   (b) defining a parameter set for each picture type T, each parameter set comprising:
      a quantization parameter ($Q_T$);
      a first parameter ($\alpha_T$);
      a second parameter ($\beta_T$);
   (c) estimating a number of bits $R_{cur}$ needed to encode a current picture of picture type T according to:

$$R_{cur} = e^{\frac{Q_{cur_T} - \alpha_{cur_T}}{\beta_{cur_T}}}$$

wherein:
- $Q_{cur_T}$ is a value of $Q_T$ of the current picture of type T;
- $\alpha_{cur_T}$ is a value of $\alpha_T$ of the current picture of type T;
- $\beta_{cur_T}$ is a value of $\beta_T$ of the current picture of type T;

(d) estimating a number of bits $R_i$ needed to encode each remaining picture i of the window of M pictures of picture type T according to:

$$R_i = e^{\frac{Q_{i_T} - \alpha_{i_T}}{\beta_{i_T}}}$$

wherein:
- $Q_{i_T}$ is a value of $Q_T$ of each remaining picture i of type T;
- $\alpha_{i_T}$ is a value of $\alpha_T$ of each remaining picture i of type T;
- $\beta_{i_T}$ is a value of $\beta_T$ of each remaining picture i of type T;

(e) determining, for the current picture and each remaining picture i of the window of M pictures and from the estimated number of bits to needed to encode the current picture $R_{cur}$ and the estimated number of bits needed encode each remaining picture i of the window of M pictures, if a maximum video buffer boundary $B_{upper}$ or a minimum video buffer boundary $B_{low}$ are exceeded;

(f) if the maximum video buffer boundary $B_{upper}$ or the minimum video buffer boundary $B_{low}$ are exceeded, adjusting $Q_{cur_T}$ for the current picture of picture type T and $Q_{i_T}$ of each remaining picture i of picture type T, and repeating steps (d)-(f); and (g) if the maximum video buffer boundary $B_{upper}$ and the minimum video buffer boundary $B_{low}$ are not exceeded, coding the current picture according to $Q_{cur_T}$, wherein:
step (c) further comprises:
  determining if a statistic of the current picture differs from a statistic of one or more pictures adjacent the current picture by greater than a threshold value;
  if the statistic of the current picture differs from the statistic of the one or more adjacent pictures by greater than the threshold value, estimating the number of bits $R_{cur}$ needed to encode the current picture type T according to:

$$R_{cur} = e^{\frac{Q_{prev\_cur_T} - \alpha_{cur_T}}{\beta_{cur_T}}}$$

wherein the $Q_{prev\_cur_T}$ value of a previous picture of the current picture of the same type T;

step (d) further comprises:
  determining if a statistic of each of the remaining pictures i differs from a statistic of one or more pictures adjacent the remaining picture i by greater than a threshold value;
  if the statistic of the each of the pictures i differs from the statistic of the one or more pictures adjacent the remaining picture i by greater than the threshold value, estimating the number of bits $R_i$ needed to encode the current picture type T according to:

$$R_i = e^{\frac{Q_{prev\_i_T} - \alpha_{cur_T}}{\beta_{cur_T}}}$$

wherein $Q_{prev\_i_T}$ is a value of a previous of the remaining picture i of the same type T.

2. The method of claim 1, further comprising:
after coding the current picture according to $Q_{cur_T}$:
  updating $\alpha_T$ and $\beta_T$ for the picture type T of the current picture;
  setting a next remaining picture as the current picture and performing steps (c)-(g).

3. The method of claim 1, further comprising:
determining if a scene change has occurred in the current picture or any remaining picture i of the window of M pictures;
if a scene change has occurred in the current picture of any remaining picture of i of the window of M pictures:
  resetting $\alpha_T$ to an initial value $\alpha_{T_{initial}}$ for each picture types T for all pictures following the scene change in the window of M pictures; and
  resetting $\beta_T$ to an initial value $\beta_{T_{initial}}$ for each picture type T for all pictures following the scene change in the window of M pictures.

4. The method of claim 3, wherein:
the initial value $\beta_{T_{initial}}$ is determined according to a mapping of statistics of the values of $\beta_T$ for picture types T of other pictures in the window of pictures; and
the initial value $\beta_{T_{initial}}$ is determined according to a mapping of statistics of the values of $\beta_T$ for picture types T of other pictures in the window of pictures.

5. The method of claim 3, wherein:
the mapping of statistics of the values of $\beta_T$ for picture types T of other pictures in the window of pictures comprises the function $\alpha = f(SAD)$;
the mapping of statistics of the values of $\beta_T$ for picture types T of other pictures in the window of pictures comprises the function $\beta = g(SAD)$; and
wherein SAD comprises a sum of an absolute difference between the current picture and the other pictures in the window.

6. The method of claim 1, further comprising:
determining if a number of intra coding units in the current picture or any remaining picture i of the window of M pictures comprises more than a percentage of the picture;
if the number of intra coding units in the current picture or any remaining picture i of the window of M pictures comprises more than a percentage of the picture:
resetting $\alpha_T$ to an initial value $\alpha_{T_{initial}}$; and
resetting $\beta_T$ to an initial value $\beta_{T_{initial}}$ for each picture type T for all pictures following a scene change in the window of M pictures.

7. The method of claim 1, wherein the determination if a maximum video buffer boundary $B_{upper}$ or a minimum video buffer boundary $B_{low}$ are exceeded is further determined from a predicted number of bits of the previously coded picture.

8. The method according to claim 1, wherein determining if a statistic of the current picture differs from a statistic of one or more adjacent pictures by greater than a threshold value comprises:
determining if a sum of absolute difference value of the current picture is different than an average value of a sum of absolute difference value of the one or more adjacent pictures exceeds a threshold value.

9. The method of claim 8, wherein:
estimating the number of bits R needed to encode the current picture type T according to $$R_{cur} = e^{\frac{Q_{prev\_cur_T} - \alpha_{cur_T}}{\beta_{cur_T}}}$$

comprises:
estimating the number of bits R needed to encode the current picture type T according to:

$$R_{cur} = e^{\frac{(Q_{prev\_cur_T} + \Delta Q_{cur\_offset_T}) - \alpha_{cur_T}}{\beta_{cur_T}}}$$

wherein the $\Delta Q_{cur\_offset}$ is an offset determined at least in part according to the difference between the statistic of the current picture and the one or more pictures adjacent to the current picture;
estimating the number of bits needed to encode the current picture type T according to $$R_i = R_i = e^{\frac{Q_{prev\_i_T} - \alpha_{cur_T}}{\beta_{cur_T}}}$$

comprises:
estimating the number of bits $R_i$ needed to encode the current picture type T according to according to $$R_i = e^{\frac{(Q_{prev\_i_T} + \Delta Q_{i\_offset_T}) - \alpha_{cur_T}}{\beta_{cur_T}}}$$

wherein the $\Delta Q_{i\_offset}$ is an offset determined at least in part according to the difference between the statistic of the current picture and the one or more pictures adjacent to the current picture.

10. The method of claim 1, further comprising:
after coding the current picture, setting a next remaining picture as the current picture without updating $\alpha_T$ and $\beta_T$ for the picture type T of the current picture; and performing steps (c)-(g).

11. An apparatus for controlling a bit rate of an encoded video comprising a plurality of pictures, each of the plurality of pictures being of one of a plurality of picture types, comprising:
a processor;
a memory, communicatively coupled to the processor, the memory storing instructions for:
(a) defining a window of M pictures comprising a plurality of window pictures;
(b) defining a parameter set for each picture type T, each parameter set comprising:
a quantization parameter ($Q_T$);
a first parameter ($\alpha_T$);
a second parameter ($\beta_T$);
(c) estimating a number of bits R needed to encode a current picture of picture type T according to:

$$R_{cur} = e^{\frac{Q_{cur_T} - \alpha_{cur_T}}{\beta_{cur_T}}}$$

wherein:
$Q_{cur_T}$ is a value of $Q_T$ of the current picture of type T;
$\alpha_{cur_T}$ is a value of $\alpha_T$ of the current picture of type T;
$\beta_{cur_T}$ is a value of $\beta_T$ of the current picture of type T;

(d) estimating a number of bits $R_i$ needed to encode each remaining picture i of the window of M pictures of picture type T according to:

$$R_i = e^{\frac{Q_{i_T} - \alpha_{i_T}}{\beta_{i_T}}}$$

wherein:
$Q_{i_T}$ is a value of $Q_T$ of each remaining picture i of type T;
$\alpha_{i_T}$ is a value of $\alpha_T$ of each remaining picture i of type T;
$\beta_{i_T}$ is a value of $\beta_T$ of each remaining picture i of type T;

(e) determining, for the current picture and each remaining picture i of the window of M pictures and from the estimated number of bits to needed to encode the current picture $R_{cur}$ and the estimated number of bits needed encode each remaining picture i of the window of M pictures, if a maximum video buffer boundary $B_{upper}$ or a minimum video buffer boundary $B_{low}$ are exceeded;

(f) if the maximum video buffer boundary $B_{upper}$ or the minimum video buffer boundary $B_{low}$ are exceeded, adjusting $Q_{cur_r}$ for the current picture of picture type T and $Q_{i_r}$ of each remaining picture i of picture type T, and repeating instructions (d)-(f); and (g) if the maximum video buffer boundary $B_{upper}$ and the minimum video buffer boundary $B_{low}$ are not exceeded, coding the current picture according to $Q_{cur_r}$;

wherein:
instruction (c) further comprises instructions for:
determining if a statistic of the current picture differs from a statistic of one or more pictures adjacent the current picture by greater than a threshold value;
if the statistic of the current picture differs from the statistic of the one or more adjacent pictures by greater than the threshold value, estimating the number of bits $R_{cur}$ needed to encode the current picture type T according to:

$$R_{cur} = e^{\frac{Q_{prev\_cur_T} - \alpha_{cur_T}}{\beta_{cur_T}}}$$

wherein the $Q_{prev\_cur}$ value of a previous picture of the current picture of same type T;
instruction (d) further comprises instructions for:
determining if a statistic of each of the remaining pictures i differs from a statistic of one or more pictures adjacent the remaining picture i by greater than a threshold value;
if the statistic of the each of the pictures i differs from the statistic of the one or more pictures adjacent the remaining picture i by greater than the threshold value, estimating the number of bits $R_i$ needed to encode the current picture type T according to:

$$R_i = e^{\frac{Q_{prev\_i_T} - \alpha_{cur_T}}{\beta_{cur_T}}}$$

wherein $Q_{prev\_i_T}$ is a value of a previous of the remaining picture i of the same type T.

12. The apparatus of claim 11, wherein the instructions further comprise instructions for:
after coding the current picture according to $Q_{cur}$:
updating $\alpha_T$ and $\beta_T$ for the picture type T of the current picture;
setting a next remaining picture as the current picture and performing instructions (c)-(g).

13. The apparatus of claim 11, wherein the instructions further comprise:
determining if a scene change has occurred in the current picture or any remaining picture i of the window of M pictures;
if a scene change has occurred in the current picture of any remaining picture of i of the window of M pictures:
resetting $\alpha_T$ to an initial value $\alpha_{T_{initial}}$ for each picture types T for all pictures following the scene change in the window of M pictures; and
resetting $\beta_T$ to an initial value $B_{T_{initial}}$ for each picture type T for all pictures following the scene change in the window of M pictures.

14. The apparatus of claim 13, wherein:
the initial value $\alpha_{T_{initial}}$ is determined is determined according to a mapping of statistics of the values of $\alpha_T$ for picture types T of other pictures in the window of pictures; and
the initial value $\beta_{T_{initial}}$ is determined according to a mapping of statistics of the values of $\beta_T$ for picture types T of other pictures in the window of pictures.

15. The apparatus of claim 13, wherein:
the mapping of statistics of the values of $\alpha_T$ for picture types T of other pictures in the window of pictures comprises the function $\alpha = f(SAD)$;
the mapping of statistics of the values of $\beta_T$ for picture types T of other pictures in the window of pictures comprises the function $\beta = g(SAD)$; and
wherein SAD is a sum of an absolute difference between the current picture and the other pictures in the window.

16. The apparatus of claim 11, wherein the instructions further comprise instructions for:
determining if a number of intra coding units in the current picture or any remaining picture i of the window of M pictures comprises more than a percentage of the picture;
if the number of intra coding units in the current picture or any remaining picture i of the window of M pictures comprises more than a percentage of the picture:
resetting $\alpha_T$ to an initial value $\alpha_{T_{initial}}$; and
resetting $\beta_T$ to an initial value $\beta_{T_{initial}}$ for each picture type T for all pictures following a scene change in the window of M pictures.

17. The apparatus of claim 11, wherein the determination if a maximum video buffer boundary $B_{upper}$ or a minimum video buffer boundary $B_{low}$ are exceeded is further determined from a predicted number of bits of the previously coded picture.

18. The apparatus according to claim 11, wherein the instruction for determining if a statistic of the current picture differs from a statistic of one or more adjacent pictures by greater than a threshold value comprise instructions for:
determining if a sum of absolute difference value of the current picture is different than an average value of a sum of absolute difference value of the one or more adjacent pictures exceeds a threshold value.

* * * * *